United States Patent
Williams et al.

(10) Patent No.: US 12,050,798 B2
(45) Date of Patent: Jul. 30, 2024

(54) MEMORY MIGRATION WITHIN A MULTI-HOST DATA PROCESSING ENVIRONMENT

(71) Applicant: INTERNATIONAL BUSINESS MACHINES CORPORATION, Armonk, NY (US)

(72) Inventors: Derek E. Williams, Round Rock, TX (US); Guy L. Guthrie, Austin, TX (US); William J. Starke, Round Rock, TX (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 17/388,993

(22) Filed: Jul. 29, 2021

(65) Prior Publication Data

US 2023/0036054 A1     Feb. 2, 2023

(51) Int. Cl.
*G06F 3/06*       (2006.01)
*G06F 12/1009*    (2016.01)
(Continued)

(52) U.S. Cl.
CPC .......... *G06F 3/0647* (2013.01); *G06F 3/0604* (2013.01); *G06F 3/0644* (2013.01);
(Continued)

(58) Field of Classification Search
CPC .... G06F 3/0647; G06F 3/0604; G06F 3/0644; G06F 3/0665; G06F 3/067;
(Continued)

(56) References Cited

U.S. PATENT DOCUMENTS

| 8,407,697 | B2 | 3/2013 | Nevarez et al. |
| 8,984,240 | B2 | 3/2015 | Aslot et al. |

(Continued)

FOREIGN PATENT DOCUMENTS

| WO | 2013006801 A3 | 1/2013 |
| WO | 2019160542 A1 | 8/2019 |

OTHER PUBLICATIONS

Ganguly, D.; Interplay Between Hardware Prefetcher and Page Eviction Policy in CPU-GPU Unified Virtual Memory, Jun. 2019.

(Continued)

*Primary Examiner* — Kenneth Tang
(74) *Attorney, Agent, or Firm* — Brian F. Russell; Randy Emilio Tejeda

(57) ABSTRACT

A destination host includes a processor core, a system fabric, a memory system, and a link controller communicatively coupled to the system fabric and configured to be communicatively coupled, via a communication link, to a source host with which the destination host is non-coherent. The destination host migrates, via the communication link, a state of a logical partition from the source host to the destination host and page table entries for translating addresses of a dataset of the logical partition from the source host to the destination host. After migrating the state and page table entries, the destination host initiates execution of the logical partition on the processor core while at least a portion of the dataset of the logical partition resides in the memory system of the source host and migrates, via the communication link, the dataset of the logical partition to the memory system of the destination host.

24 Claims, 13 Drawing Sheets

(51) Int. Cl.
  *G06F 13/28*  (2006.01)
  *G06F 9/455*  (2018.01)
(52) U.S. Cl.
  CPC ............ *G06F 3/0665* (2013.01); *G06F 3/067* (2013.01); *G06F 12/1009* (2013.01); *G06F 13/28* (2013.01); *G06F 2009/4557* (2013.01); *G06F 2009/45583* (2013.01); *G06F 2212/657* (2013.01)
(58) Field of Classification Search
  CPC ................ G06F 12/1009; G06F 13/28; G06F 2009/4557; G06F 2009/45583; G06F 2212/657; G06F 9/5088; G06F 12/0811; G06F 12/1027; G06F 9/461; G06F 9/45558; G06F 9/5077
  See application file for complete search history.

(56) References Cited

U.S. PATENT DOCUMENTS

| | | | |
|---|---|---|---|
| 9,336,042 B1* | 5/2016 | Brenneman et al. | G06F 9/5088 |
| 9,904,473 B2 | 2/2018 | Kumar et al. | |
| 2011/0179415 A1 | 7/2011 | Donnellan | |
| 2014/0208042 A1* | 7/2014 | Chinya | G06F 12/1027 |
| | | | 711/147 |
| 2017/0132028 A1* | 5/2017 | Tsirkin | G06F 9/45558 |
| 2019/0068557 A1 | 2/2019 | Noel | |
| 2020/0409585 A1* | 12/2020 | Koufaty | G06F 3/0647 |
| 2021/0089347 A1 | 3/2021 | Gaonkar | |
| 2021/0124602 A1 | 4/2021 | Tsirkin | |

OTHER PUBLICATIONS

Chapman, M. et al.; Implementing Transparent Shared Memory on Clusters Using Virtual Machines, Apr. 2005.
Anonymously;Method to Reduce the Time for Live Partition Migration via Cooperative Approach by Database Manager, May 28, 2012.
Anonymously; Live Virtual Machine Migration Across Hypervisor Systems by Leveraging the Commonality in Memory Contents of To-Be Migrated VM and of VMs Hosted on Destination Hypervisor, May 15, 2012.
Anonymously; Method for Tracking Association of Tasks and Its Memory References in Order to Improve Locality of Reference in NUMA System, Feb. 8, 2017.
International Search Report and Written Opinion of International Searching Authority, 12 pages, European Patent Office.

* cited by examiner

MEMORY MIGRATION WITHIN A MULTI-HOST DATA PROCESSING ENVIRONMENT

BACKGROUND OF THE INVENTION

The present invention relates generally to data processing and, in particular, to memory migration within a multi-host data processing environment.

In general, cloud computing refers to a computational model in which data processing, data storage, and network resources, software, and data are accessible to remote data processing systems, where the details of the underlying information technology (IT) infrastructure providing such resources is transparent to consumers of cloud services. In various implementations, the IT infrastructure can be on-premises or off-premises (or a hybrid of the two) with respect to cloud consumers. Further, the cloud computing resources can be (but are not required to be) widely geographically and/or topologically distributed.

Cloud computing is facilitated by ease-of-access to remote computing websites (e.g., via the Internet or a private corporate network) and frequently takes the form of web-based resources, tools, or applications that a cloud consumer can access and use through a web browser, as if the resources, tools or applications were a local program installed on a computer system of the cloud consumer. Commercial cloud implementations are generally expected to meet quality of service (QoS) requirements of cloud consumers, which may be specified in service level agreements (SLAs). In a typical cloud implementation, cloud consumers consume computational resources as a service and pay only for the resources used.

Adoption of cloud computing has been facilitated by the widespread utilization of virtualization, which is the creation of virtual (rather than actual) instances of computing resources, e.g., an operating system, a server, a storage device, network resources, etc. For example, a virtual machine (VM), also referred to as a logical partition (LPAR), is a software implementation of a physical machine (e.g., a computer system) that executes instructions like a physical machine. VMs can be categorized as system VMs or process VMs. A system VM provides a complete system platform that supports the execution of a complete operating system (OS), such as Windows, Linux, Android, etc., as well as its associated applications. A process VM, on the other hand, is usually designed to run a single program and support a single process. In either case, any application software running on the VM is limited to the resources and abstractions provided by that VM. Consequently, the actual resources provided by a common IT infrastructure can be efficiently managed and utilized through the deployment of multiple VMs, possibly from multiple different cloud computing customers. The virtualization of actual IT resources and management of VMs is typically provided by software referred to as a VM monitor (VMM) or hypervisor.

In a typical virtualized computing environment, VMs and VMMs can communicate with each other and with physical entities in the IT infrastructure of the computing environment utilizing conventional input/output (I/O) and networking protocols. As is known in the art, conventional networking protocols are commonly premised on the well-known seven layer Open Systems Interconnection (OSI) model, which includes (in ascending order) physical, data link, network, transport, session, presentation and application layers. In some implementations, VMs and VMMs are enabled to communicate with other network entities as if the VMs and VMMs were physical network elements through the substitution of a virtual network connection for the conventional physical layer connection. This conventional virtualized I/O and network infrastructure is referred to in the art as a virtual input-output server (VIOS).

In a cloud computing environment as described, computational workloads can generally be characterized as including two components: a workload state maintained in the registers and caches of the physical host executing the workload and a workload dataset residing in the data storage of the physical host. These computational workloads are frequently transferred between physical hosts for various reasons, including, for example, data processing system maintenance and upgrades, load balancing, regulatory compliance, security, and resource optimization.

According to one conventional technique of transferring an executing workload from a source host to a destination host, the operating systems or hypervisors of the source and destination hosts first coordinate copying of the workload dataset from the memory of the source host to the memory of the destination host via the VIOS on a memory page-by-memory page basis. After the workload dataset is successfully transferred, the operating systems or hypervisors of the source and destination hosts coordinate transfer of the workload state from the source host to the destination host via the VIOS. As the workload continues to run on the source host during the transfer of the workload from the source host to the destination host, the workload commonly continues to both read from and write to the workload dataset. Using this technique, each update (write) by the source host to a memory page that has already been transferred to the destination host necessitates a second transfer of the now-updated memory page, thus lengthening the time required for the workload migration in an unpredictable way.

In an alternative technique, the operating systems or hypervisors of the source and destination hosts first coordinate transfer of the workload state from the source host to the destination host via the VIOS, begin execution of the workload on the destination host, and thereafter migrate memory pages from the source host to the destination host based on demand-paging. Thus, each time the workload executing on the destination host generates an access request for data in a memory page residing on the source host, a software page fault is generated, and the operating systems or hypervisors handle the page fault by copying the requested memory page from the source host to the destination host via the VIOS. Using this alternative technique, memory pages are transferred from the source host to the destination host only once, but the workload suffers from poor responsiveness during the entire period of workload migration due to the significant latency required to service each demand paging request.

Both of the conventional workload migration techniques described herein transfer of the workload between non-coherent hosts utilizing the VIOS, which is characterized by high communication overhead and latency due, in part, to the many protocol layers that must be traversed to communicate the workload data set and workload state between hosts.

BRIEF SUMMARY

The various embodiments of the present invention provide support for live migration of a workload between non-coherent hosts while avoiding the communication overhead and latency associated with VIOS (or external networks) while transferring the workload state and workload dataset.

In at least one embodiment, a destination host includes a processor core, a memory system communicatively coupled to the processor core, and a link controller communicatively coupled to the processor core and configured to be communicatively coupled, via a communication link, to a source host with which the destination host is non-coherent. The destination host migrates, via the communication link, a state of a logical partition from the source host to the destination host and page table entries for translating addresses of a dataset of the logical partition from the source host to the destination host. After migrating the state and page table entries, the destination host initiates execution of the logical partition on the processor core while at least a portion of the dataset of the logical partition resides in the memory system of the source host and migrates, via the communication link, the dataset of the logical partition to the memory system of the destination host.

Aspects of the invention can also be implemented as a method of data processing in which a destination host migrates a logical partition from a source host to the destination host via a communication link. In one example, the destination host migrates, via the communication link, a state of a logical partition from the source host to the destination host and page table entries for translating addresses of a dataset of the logical partition from the source host to the destination host. After migrating the state and page table entries, the destination host initiates execution of the logical partition on the processor core while at least a portion of the dataset of the logical partition resides in the memory system of the source host and migrates, via the communication link, the dataset of the logical partition to the memory system of the destination host.

Aspects of the invention can also be implemented as a program product. In one example, the program product includes a computer-readable storage device and program code, stored within the computer-readable storage device, which when executed by a data processing system serving as a destination host causes the destination host to migrate a logical partition from a source host to the destination host via a communication link. In one example, the destination host migrates, via the communication link, a state of a logical partition from the source host to the destination host and page table entries for translating addresses of a dataset of the logical partition from the source host to the destination host. After migrating the state and page table entries, the destination host initiates execution of the logical partition on the processor core while at least a portion of the dataset of the logical partition resides in the memory system of the source host and migrates, via the communication link, the dataset of the logical partition to the memory system of the destination host.

In some examples or operating scenarios, while migrating the dataset of the logical partition, the logical partition executing on the destination host may access any data within the dataset of the logical partition without page fault, regardless of a migration status of memory pages containing said any data.

In some examples or operating scenarios, migrating the dataset includes migrating at least some of the dataset of the logical partition from the source host to the destination host after the logical partition has begun execution on the destination host.

In some examples or operating scenarios, the destination host tracks in the page table entries which of a plurality of corresponding memory pages in the dataset have been migrated to the destination host.

In some examples or operating scenarios, the destination host coordinates migration of the logical partition from the source host to the destination host utilizing communication via a network connection, but refrains from migrating the dataset, the page table entries, and the state of the logical partition via the network connection.

In some examples or operating scenarios, the destination host includes a page frame table and a link controller coupled to the communication link, where the link controller has an associated real address range within a real address space of the destination host. Migrating page table entries includes the destination host receiving a page table entry for a memory page in the dataset of the migrating logical partition from the source host, where the page table entry specifies a first real address in a real address space of the source host. The destination host installs the page table entry in the page frame table and updates the first real address in the page table entry to a second real address within the real address range associated with the link controller. The destination host also establishes in a translation circuit a real address-to-real address translation between the second real address and the first real address.

In some examples or operating scenarios, based on a first memory access operation of logical partition on the destination host prior to migration of the memory page from the source host to the destination host, a target real address of the memory access operation is translated by reference to the real address-to-real address translation in the translation circuit to obtain a resulting real address, and a corresponding second memory access operation that specifies the resulting real address is issued in the source host.

In some examples or operating scenarios, the second memory access operation is a direct memory access (DMA) read-with-intent-to-modify operation that forces invalidation in the source host of any cached copy of data associated with the resulting real address.

DETAILED DESCRIPTION

Figure 1:
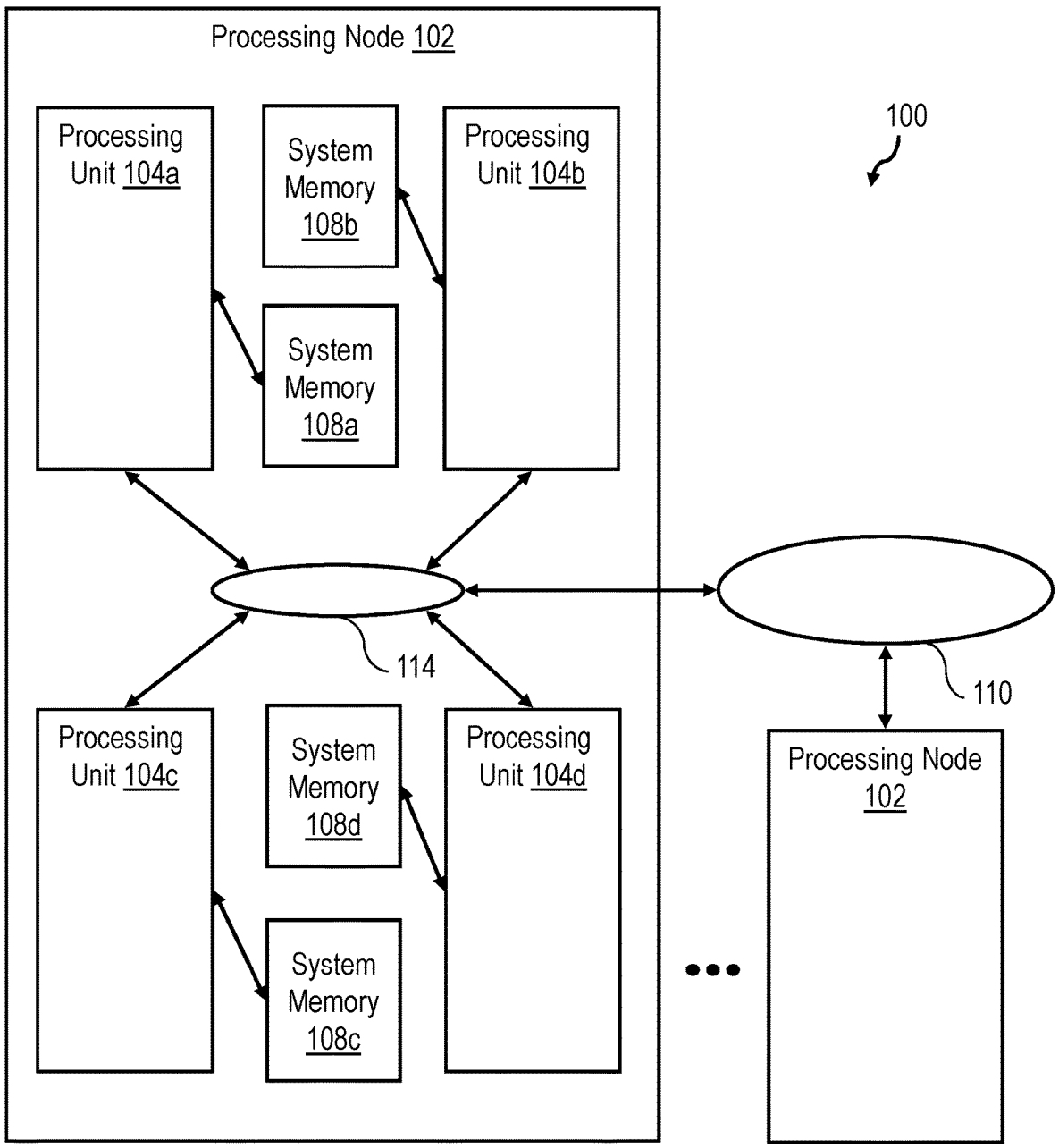
FIG. 1 is a high-level block diagram of an exemplary host data processing system in accordance with one embodiment.

With reference now to the figures, in which like reference numerals refer to like and corresponding parts throughout, and in particular with reference to FIG. 1, there is illustrated a high-level block diagram depicting an exemplary data processing system 100 in accordance with one embodiment. In various use cases and topologies, a data processing system such as data processing system 100, which includes hardware components and may additionally include software and/or firmware components, may be referred to in the art as a "host" or "host data processing system." In various operating scenarios, any given host may be a source host from which a workload (e.g., a logical partition) can be migrated or a destination host to which a workload is migrated. In accordance with the described embodiments, the state and page table entries of the logical partition are migrated to the destination host in advance of the memory pages containing the dataset of the logical partition.

In the depicted embodiment, host data processing system 100 is a cache-coherent multiprocessor (MP) data processing system including multiple processing nodes 102 for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing one or more (e.g., four) processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form a system fabric. In at least some preferred embodiments, communication on the system fabric is compliant with a so-called host bus protocol, which defines, inter alia, predetermined sets of legal requests, responses, and control information communicated between communication participants (e.g., caches, memory controllers, etc.) via the system fabric.

As described below in greater detail with reference to FIG. 2, in some embodiments, one or more of processing units 104 (and possibly all of processing units 104) each include a memory controller 106 coupled to local interconnect 114 to provide an interface to a respective system memory 108. Data and instructions residing in system memories 108 can generally be accessed, cached and modified by a processor core in any processing unit 104 of any processing node 102 within data processing system 100. In alternative embodiments, one or more memory controllers 106 (and system memories 108) can be directly coupled or indirectly coupled (e.g., via a switch) to system interconnect 110 rather than a local interconnect 114.

Those skilled in the art will appreciate that data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to data processing systems of diverse architectures and are in no way limited to the generalized data processing system architecture illustrated in FIG. 1.

Figure 2:
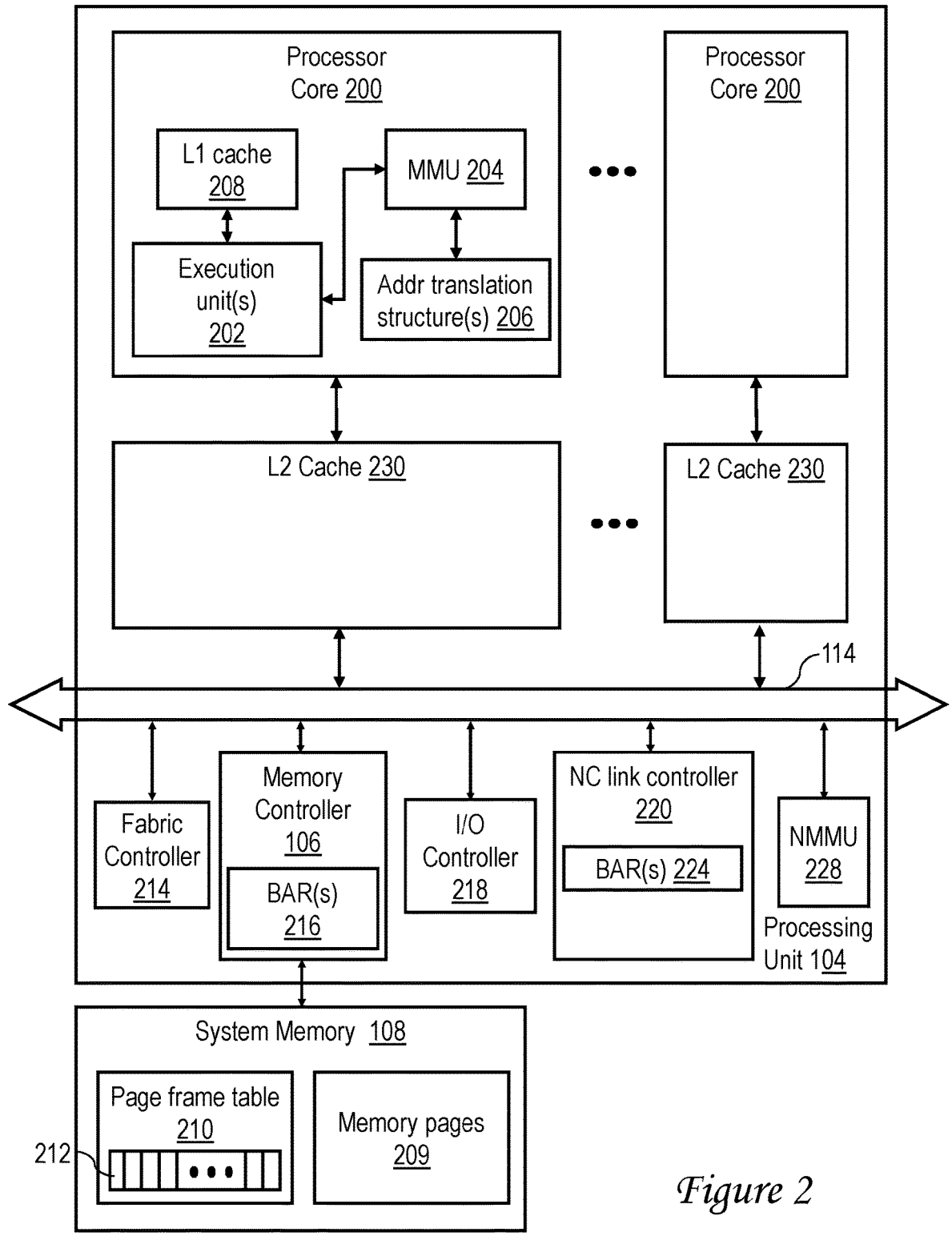
FIG. 2 is a more detailed block diagram of an exemplary processing unit of a host data processing system in accordance with one embodiment.

Referring now to FIG. 2, there is depicted a more detailed block diagram of an exemplary processing unit 104 and a system memory 108 in accordance with one embodiment. In the depicted embodiment, each processing unit 104 is an integrated circuit including one or more processor cores 200 for processing instructions and data. In the depicted example, a processor core 200 includes one or more execution units 202 capable of executing instructions from one or multiple simultaneous hardware threads of execution.

Processor core 200 additionally includes a memory management unit (MMU) 204 responsible for translating effective addresses determined by the execution of memory-referent instructions in execution unit(s) 202 into real addresses within a real address space referenced by all processing units 104 within data processing system 100. MMU 204 performs effective-to-real address translation by reference to one or more translation structure(s) 206, such as a translation lookaside buffer (TLB), effective-to-real address translation (ERAT) cache, segment lookaside buffer (SLB), etc. The number and/or type of these address translation structures may vary between implementations and architectures. Address translation structure(s) 206 reduce the latency associated with address translation by buffering local copies of selected address translations, which may be retrieved from system memories 108, as discussed further below.

The operation of each processor core 200 is supported by a multi-level memory hierarchy having at its lowest level the composite system memory provided by the various system memories 108 and made accessible via memory controllers 106. The real address range(s) for which an individual memory controller 106 is responsible can be defined, for example, by hypervisor and/or operating system software, through the appropriate configuration of one or more base address registers (BARs) 216 within the memory controller 106. As illustrated, system memories 108 store a multiplicity of memory pages 209, which provide storage for, among other things, the datasets of various workloads (also referred to as "logical partitions" (LPARs)). Additionally, one or more system memories 108 store a page frame table 210 containing a plurality of page table entries (PTEs) 212, where each PTE 212 specifies an effective-to-real address translation for a respective corresponding memory page 209 present in one of system memories 108. PTEs 212 additionally specify access protections (e.g., read-only, read/write (R/W), etc.) for the different memory pages. PTEs 212 accessed from page frame table 210 by a MMU 204 may be cached by the MMU 204 for subsequent access, for example, in address translation structure(s) 206. Page frame table 210 can be established, maintained, and updated, for example, by operating system and/or hypervisor software executing within data processing system 100.

The multi-level memory hierarchy of each processor core 200 additionally includes one or more levels of cache memory, which in the illustrative embodiment include a store-through level one (L1) cache 208 within and private to each processor core 200 and a respective store-in level two (L2) cache 230 for each processor core 200. Although the illustrated cache hierarchies includes only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache.

In the depicted embodiment, each processing unit 104 further includes an integrated and distributed fabric controller 214 responsible for controlling the flow of operations on the system fabric in accordance with the host bus protocol and for implementing the coherency communication required to implement the desired cache coherency protocol. Processing unit 104 can further include an integrated I/O (input/output) controller 218 supporting the attachment of one or more I/O devices and/or I/O channels (not illustrated).

Figure 3:
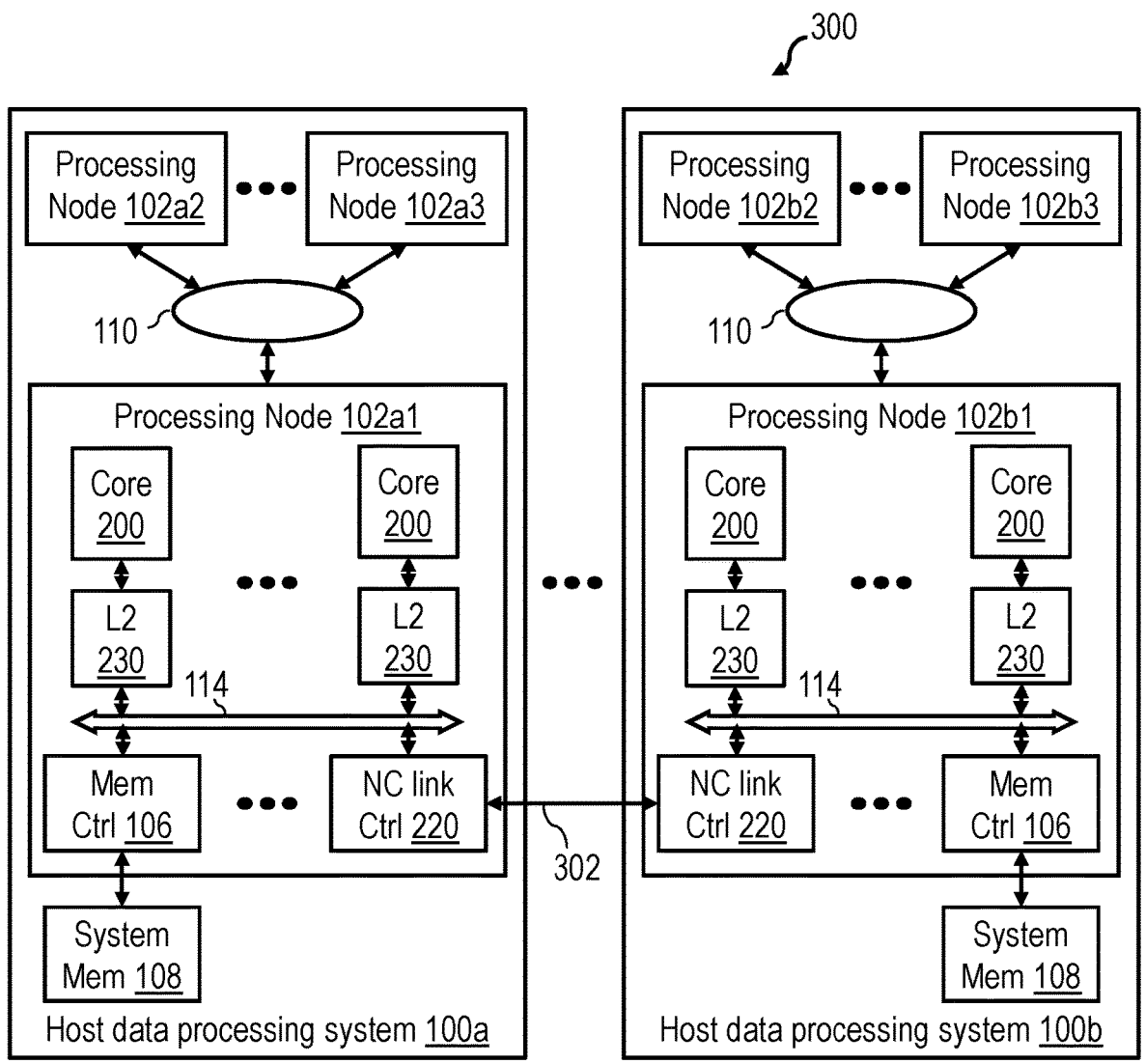
FIG. 3 illustrates an exemplary data processing system environment in which multiple hosts are coupled together by a non-coherent communication link in accordance with one embodiment.

In the depicted example, processing unit 104 also includes an attached non-coherent (NC) link controller 220 that, in at least one operating mode, supports the attachment to host data processing system 100 of another host data processing system 100 via a non-coherent communication link. For example, FIG. 3 illustrates an exemplary data processing system environment 300 in which host data processing system 100a and host data processing system 100b are coupled together for communication by a non-coherent communication link 302. (Data processing system environment 300 can optionally include one or more additional hosts 100 coupled to host 100a and/or 100b by additional non-coherent communication links 302.) In such an arrangement, each of host data processing systems 100a, 100b maintains its own respective real address space that is non-coherent with the other host(s). The real addresses range(s) for which the NC link controller 220 in each host 100a, 100b is responsible can be defined, for example, by hypervisor and/or operating system software, through the appropriate configuration of one or more base address registers (BARs) 224 within the NC link controller 220. Once configured, a memory access request transmitted on the system fabric of a host 100 that specifies a real address within a real address range defined by BAR(s) 216 of a local memory controller 106 can be serviced by that memory controller 106 by reference to the associated system memory 108. A memory access request on the system fabric that specifies a real address within a real address range defined by BAR(s) 224 of NC link controller 220 is transmitted by the NC link controller 220 via NC communication link 106 to the other host 100a or 100b. Inbound memory access requests received by an NC link controller 220 via non-coherent communication link 302 are transmitted by the NC link controller 220 on the system fabric of the receiving host 100.

Referring again to FIG. 2, processing unit 104 additionally includes a nest memory management unit (NMMU) 228, which, upon request via the system fabric, provides address translations to other communication participants, such as NC link controller 220. It should be appreciated that in other embodiments, NMMU 228 may be communicatively coupled to provide address translations to communication participants including NC link controller 220 in an alternative or additional manner, for example, by being coupled to system interconnect 110 rather than to local interconnect 114.

Figure 4:
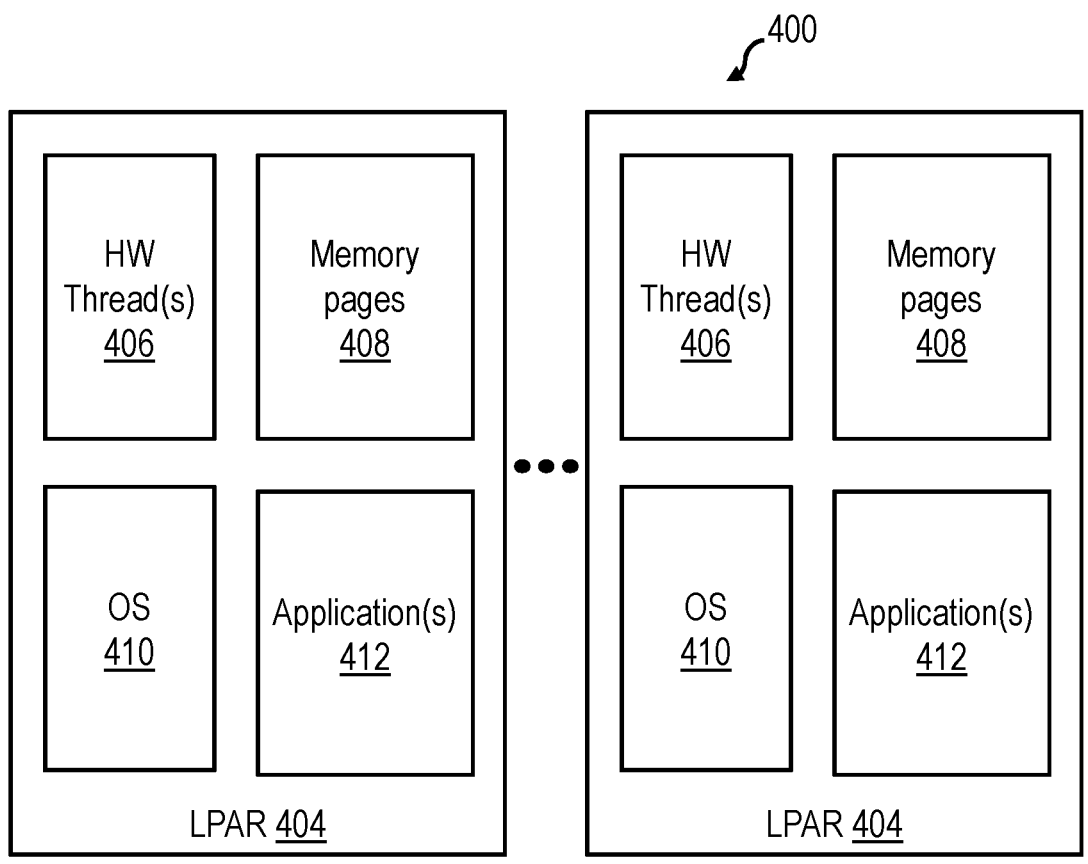
FIG. 4 depicts a logical view of a hypervisor and logical partitions of an exemplary host data processing system in accordance with one embodiment.

FIG. 4 depicts a logical view of the software configuration of a host 100a or 100b of FIGS. 1 to 3 in accordance with one embodiment. In this example, the software configuration 400 of each host 100 includes a hypervisor (or VMM) 402 that manages the hardware and software resources of the host 100. Hypervisor 402 virtualizes many of the underlying resources of host 100 through the implementation of one or more logical partitions (LPARs) 404. In this example, each LPAR 404 includes a specified number of hardware threads 406 within one or more processor cores 200 of the host 100, a collection of memory pages 408 (from memory pages 209) at specified real memory addresses for storing the dataset of the LPAR 404, an instance of an operating system 410 (e.g., Linux®, Windows®, Android®, iOS®, etc.), and a collection of application(s) 412 executing on the OS 410. Hypervisor 402 additionally supports network connections between LPARs 404 and between hypervisor 402 and other hosts 100 via a virtual input-output server (VIOS) 420 that virtualizes the physical network connection(s) to which the host 100 is coupled via I/O controller 218.

As discussed above, hypervisor 402 may determine that it is desirable or required to migrate a live workload, for example, one of LPARs 404, from its own host 100 to another host 100 for any of a variety of reasons. In accordance with the embodiments described herein, the migration preferably copies the dataset and state of the migrating LPAR 404 from the host 100 on which the LPAR 404 was initially executing (referred to herein as the "source host") to another host 100 on which the LPAR 404 continues its execution (referred to herein as the "destination host") over NC communication link 302 rather than over a virtualized network connection supported by VIOS 420 (as is conventional). Employing NC communication link 302 rather than VIOS 420 for the migration of the LPAR dataset has the advantage of reducing or eliminating duplicate transmission of the memory pages comprising the LPAR dataset, thus accelerating the LPAR migration. Employing NC communication link 302 additionally has the advantage of providing predictable response times for the application(s) 412 of the migrating LPAR.

Figure 5:
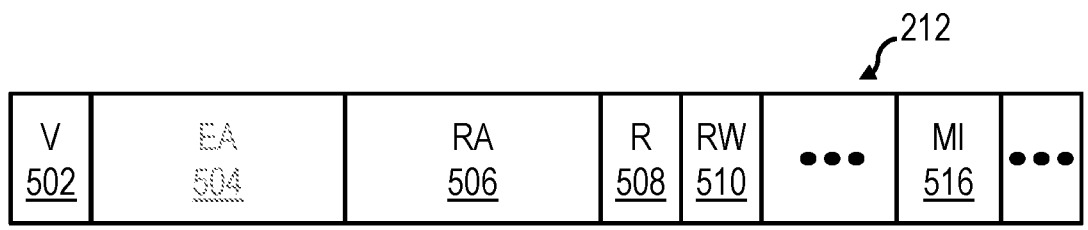
FIG. 5 illustrates an exemplary page table entry (PTE) in accordance with one embodiment.

With reference now to FIG. 5, there is illustrated an exemplary page table entry (PTE) 212 in accordance with one embodiment. In this example, PTE 212 includes a valid field 502 indicating whether or not the contents of PTE 212 are valid and thus available for use in translating effective addresses to real addresses in an associated one of memory pages 209. In addition, PTE 212 includes an effective address (EA) field 504 and a real address (RA) field 506 that respectively specify the effective address and the real address assigned to the base storage location of the associated memory page 209. PTE 212 also includes one or more page protection fields indicating one or more attributes of the associated memory page 209. For example, in the illustrated embodiment, the page protection fields include a read (R) field 508 and a read-write (RW) field 510 respectively and alternatively indicating whether the associated memory page 209 is read-only or subject to both read and write access. Hereafter, it will be assumed that field values of R=1, RW=0 indicate the associated memory page 209 is a read-only memory page and field values of R=0, RW=1 indicate the associated memory page 209 is a read-write memory page.

In the illustrated embodiment, PTE 212 additionally includes one or more migration-related fields that may be utilized by hypervisors 402 to manage the migration of the associated memory page 209 from a system memory 108 of a source host 100 to a system memory 108 of destination host 100. In this embodiment, these migration-related fields include a migration (MI) field 516 indicating whether or not the PTE 212 has been migrated (i.e., resides in the system memory 108 of the destination host 100). It should be appreciated that the implementation of migration-related field 516 in PTE 212 is a design choice and that other embodiments may omit these fields from PTE 212 and instead utilize one or more other data structures to manage the migration of an LPAR dataset.

Figure 6A:
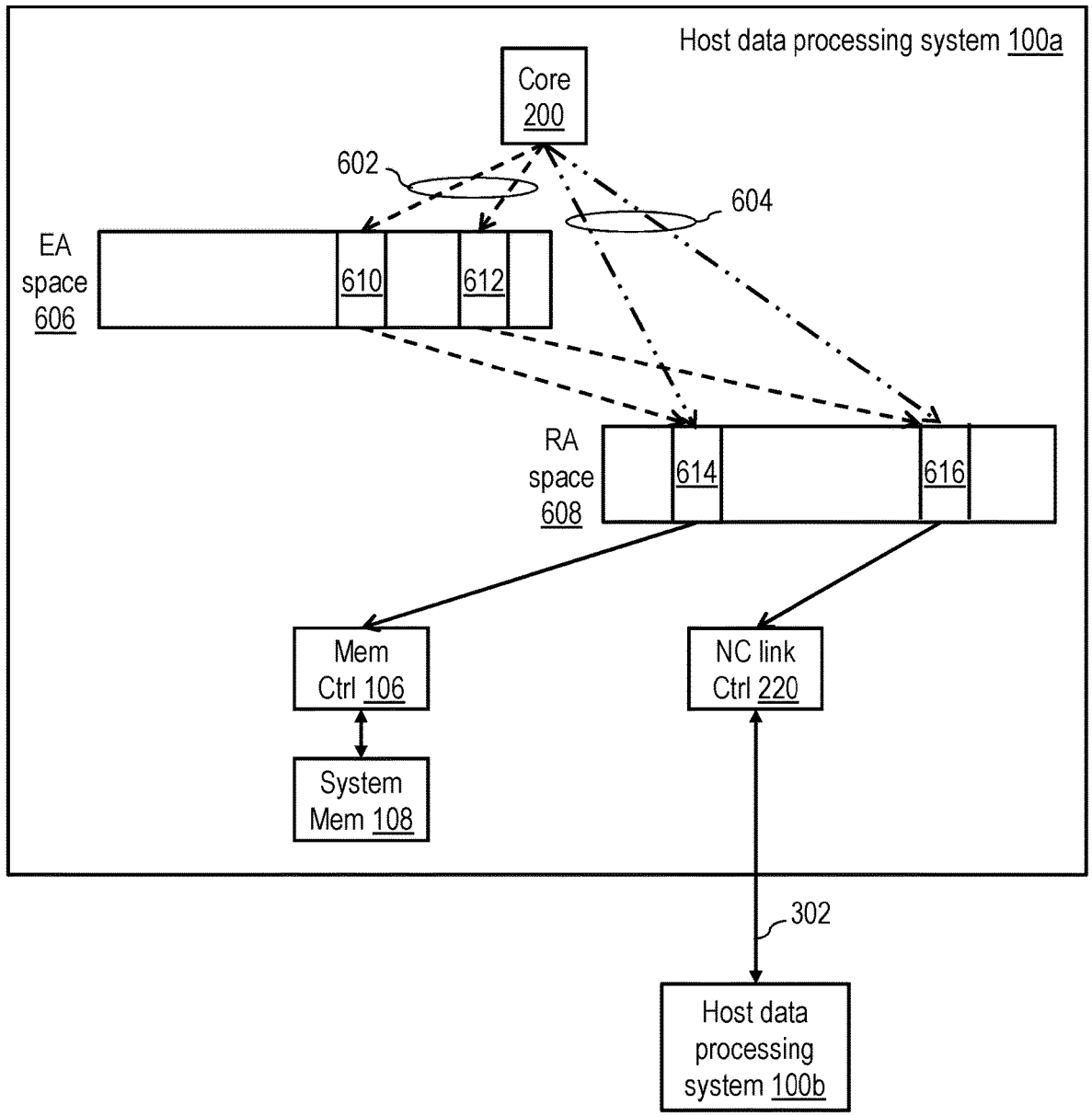
FIG. 6A depicts various memory access requests of an exemplary host data processing system in accordance with one embodiment.

Referring now to FIG. 6A, various memory access requests of an exemplary host data processing system 100 are depicted. In FIG. 6A, a core 200 of host data processing system 100 (e.g., host data processing system 100a) executes user-level instructions, for example, of an application 412, in a first hardware thread and executes instructions of a hypervisor 402 in a second hardware thread. The execution of the user-level instructions in the first hardware thread generates memory access requests 602, each of which specifies a respective target effective (logical) address to be accessed (e.g., effective address 610 or 612) in an effective address space 606. As explained above, MMU 204 of core 200 translates each of the target effective addresses 610, 612 into a respective real address 614 or 616 in real address space 608 based on the address translations provided by PTEs 212. In this example, real address 614 identifies a storage location in a system memory 108 of host data processing system 100a for which a local memory controller 106 is responsible. Real address 616, in contrast, identifies a storage location in a system memory 108 of a host data processing system 100b for which NC link controller 220 is responsible. Thus, a memory access request transmitted on the system fabric of host data processing system 100a can initiate access to a storage location in the local system memory 108 or a storage location in a remote system memory 108 of another host data processing system 100b (with which host data processing system 100a is non-coherent), depending on the assignment of real addresses by hypervisors 402 of host data processing systems 100a, 100b.

In at least some embodiments, memory access requests of hypervisors 402 need not be subject to the same address translation applied to the target addresses of user-level memory access requests 602. For example, FIG. 6A further illustrates that the instructions of hypervisor 402 executed in the second hardware thread of core 200 may also generate memory access requests 604. However, in this case, memory access requests 604 directly specify real addresses 614, 616 in real address space 608. Consequently, hypervisor 402 of host data processing system 100a can access storage locations in the local system memory 108 of host data processing system 100a and storage locations in a remote system memory 108 of host data processing system 100b without using the effective-to-real address translation recorded in PTEs 212.

Figure 6B:
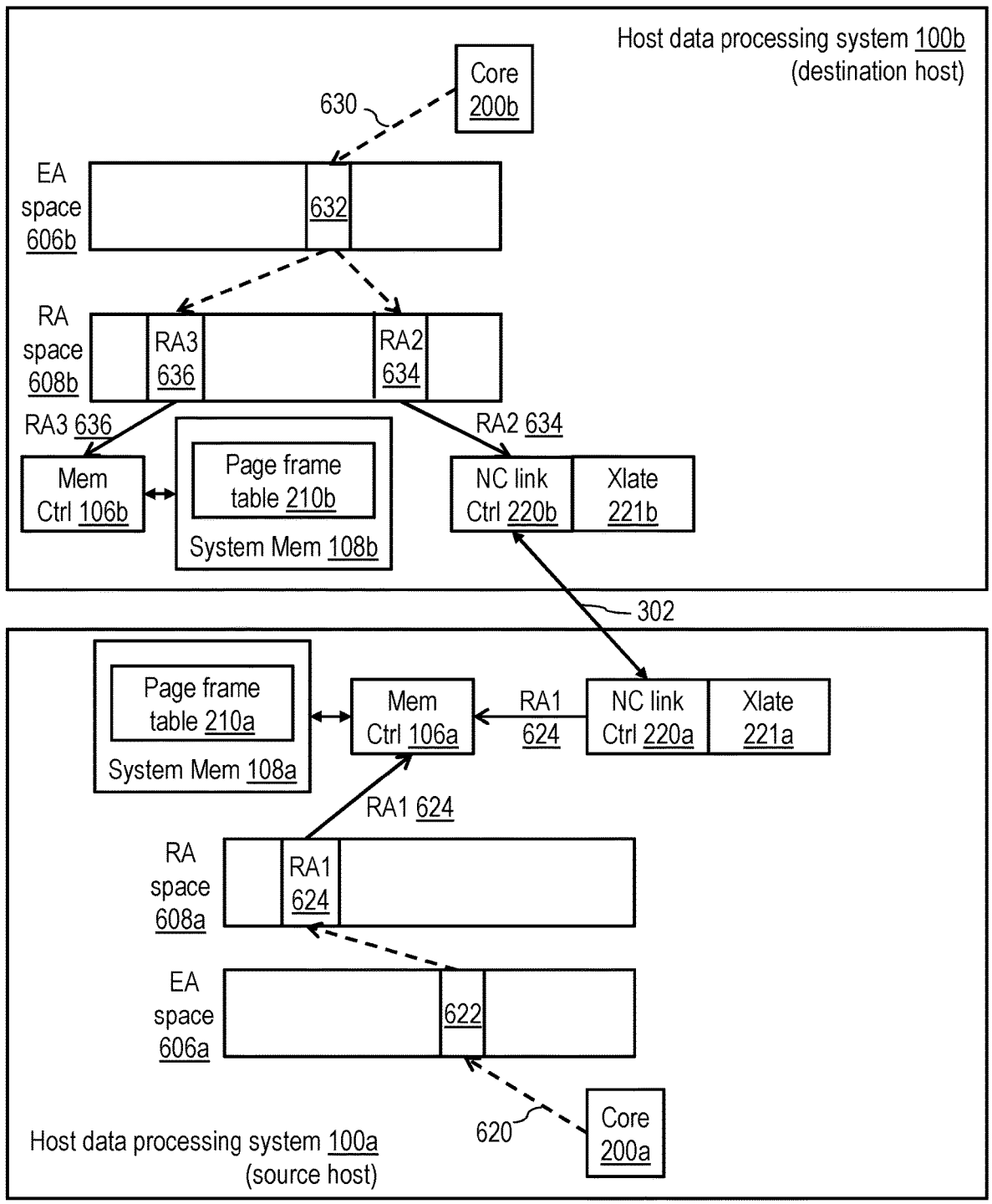
FIG. 6B depicts use of various real addresses (RAs) by source and destination host data processing systems in various phases of memory migration from the source host data processing system to the destination host data processing system in accordance with one embodiment.

Referring now to FIG. 6B, use of various real addresses (RAs) by source and destination hosts 100a, 100b in various phases of memory migration of an LPAR 404 from the source host 100a to the destination host 100b is depicted. For example, FIG. 6B illustrates that, prior to migration of a given LPAR 404, a core 200a of source host 100a that is executing user-level instructions on one of its hardware threads 406 may issue a memory access request, such as a store operation 620, which specifies a target effective address 622 in the effective address space 606a of source host 100a. As explained above, MMU 204 of core 200a translates target effective address 622 into a first real address (RA1) 624 in real address space 608a of source host 100a based on the address translations provided by PTEs 212 in page frame table 210a. In this example, RA1 624 identifies a storage location in a system memory 108a of source host 100a for which a local memory controller 106a is responsible.

Figure 11:
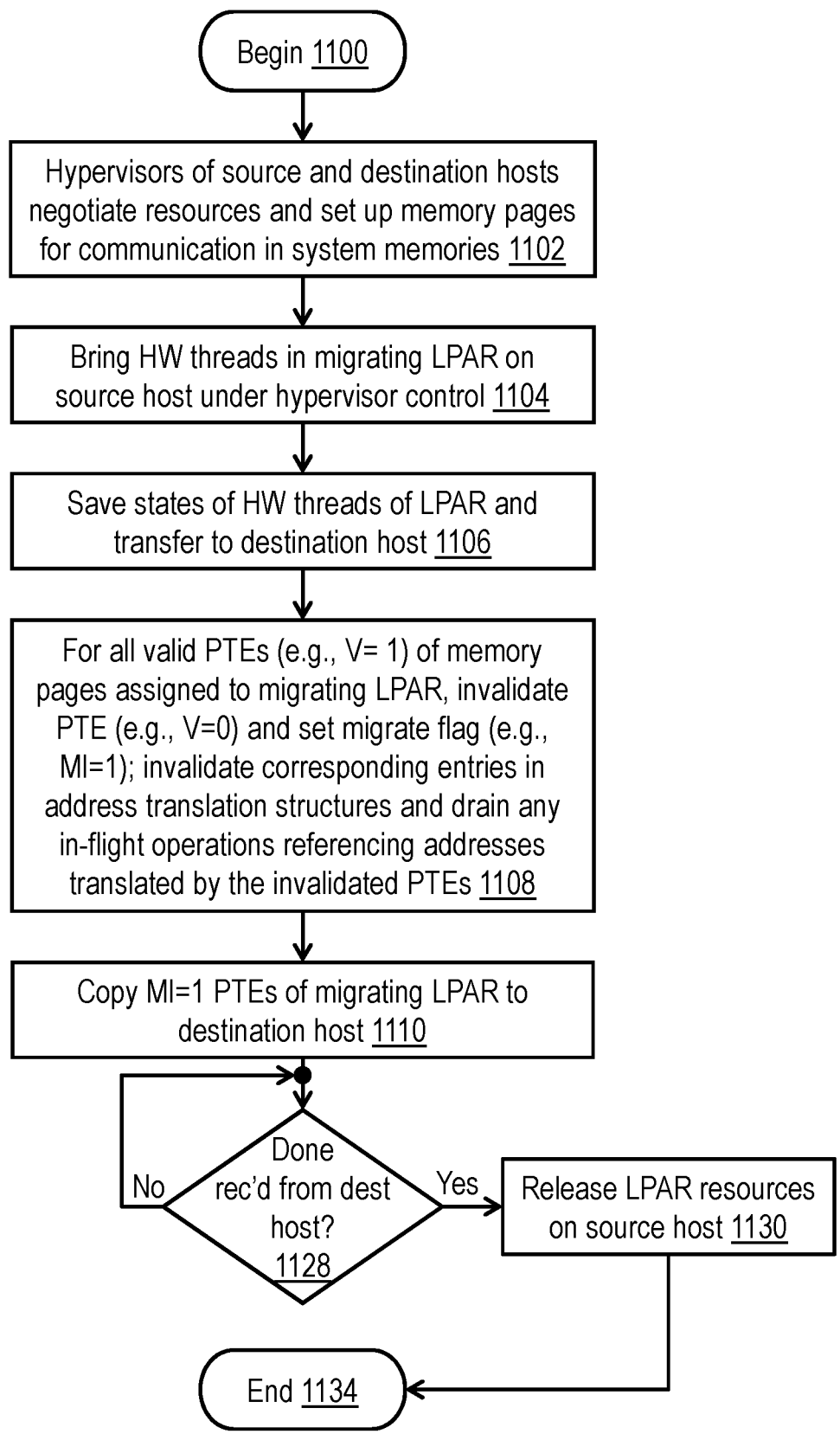
FIG. 11 is a high-level logical flowchart of an exemplary method by which the state and page table entries of a logical partition are migrated from a source host to a destination host in accordance with one embodiment.

As described further herein, for example, with reference to FIG. 11, in the course of migrating the given LPAR 404 from source host 100a to destination host 100b, the state of the LPAR 404 and its PTEs 212 are migrated to page frame table 210b of destination host 100b in advance of the migration of the memory pages 408 comprising the dataset of the LPAR 404. As the migrating LPAR 404 begins to execute on destination host 100b (as described below, for example, with reference to FIG. 12), a user-level instruction executed in a hardware thread 406 of a core 200b may cause issuance of a memory access request, for example, a load operation 630, that is intended to access data from the memory page 408 associated in source host 100a with RA1 624. Load operation 630 specifies a target effective address 632 in effective address space 606b of destination host 100b (which is different than effective address space 606a of source host 100a). In this example, at the time load operation 630 is issued, the memory page 408 from which data is requested by load operation 630 still resides in the memory system (e.g., system memory 108a and/or caches) of source host 100a.

In response to load operation 630, MMU 204 of core 200b translates target effective address 632 into a second real address (RA2) 634 in real address space 608b (which differs from real address space 608a of source host 100a). As the associated data still resides on source host 100a, NC link controller 220b of destination host 100b is configured by its BAR(s) 224 to be responsible for RA2 634. Consequently, in response to receiving load operation 630 on the system fabric of destination host 100b, NC link controller 200b of destination host 100b accepts load operation 630 and translates RA2 utilizing its translation circuit 221b into a real address in real address space 608a of source host 100a. The result of this RA-to-RA translation is RA1 624 in real address space 608a of source host 100a. NC link controller 220b then forwards load operation 630 specifying RA1 624 to NC link controller 220a, which issues a corresponding memory access operation on the system fabric of source host 100a, as described in greater detail below with reference to FIG. 15.

FIG. 6B further illustrates that in conjunction with the migration of the memory page containing the data referenced by RA1 624 from source host 100*a* to destination host 100*b*, page frame table 210*b* of destination host 100*b* is updated such that effective address 632 no longer is associated with RA2 634, but is instead associated with a third real address (RA3) 636 in real address space 608*b* (this update is described below with reference to FIG. 14). RA3 636 identifies a storage location in a system memory 108*b* of destination host 100*b* for which a local memory controller 106*b* is responsible. As a result, subsequent memory access requests of the LPAR 404 migrated to destination host 100*b* are satisfied from the memory system (e.g., system memory 108*b* and the caches) of destination host 100*b*.

Those skilled in the art will appreciate that in other embodiments, the RA- to RA translation described herein can be performed in a different manner. For example, in some embodiments, the RA-to-RA translation may be performed on source host 100*a* rather than destination host 100*b*. In such embodiments, NC link controller 220*b* of destination host 100*b* may issue a load operation 630 specifying RA2 as a target address to NC link controller 220*a*. In response to receipt of load operation 630, NC link controller 220*a* may perform RA-to-RA translation utilizing its translation circuit 221*a* in order to obtain RA1 as the target address of the memory access operation issued by NC link controller 220*a* on the system fabric of source host 100*a*. Further, those skilled in the art will appreciate that translation circuits 221*a*, 221*b* may perform translation by reference to page tables, registers with mappings between them, or other translation structures, as is known in the art.

Figures 7, 8, 9, 10:
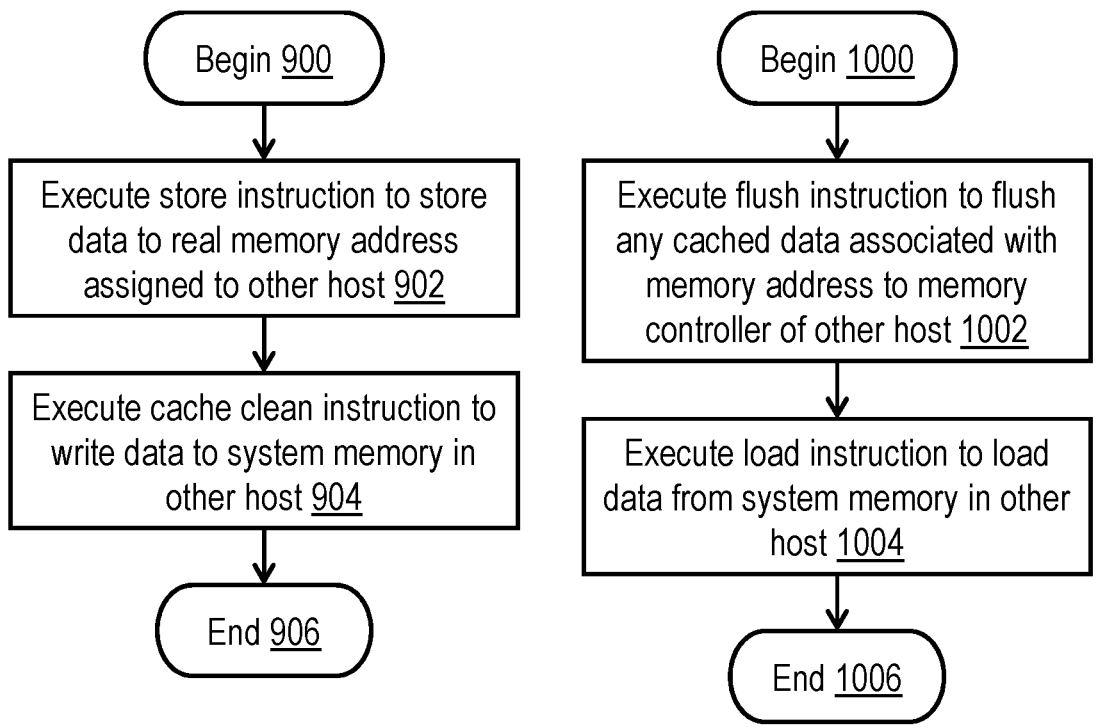
FIG. 7 illustrates an exemplary write primitive by which two host data processing systems can communicate in accordance with one embodiment.
FIG. 8 illustrates an exemplary read primitive by which two host data processing systems can communicate in accordance with one embodiment.
FIG. 9 is a high-level logical flowchart of an exemplary store operation in the write primitive of FIG. 7 in accordance with one embodiment.
FIG. 10 is a high-level logical flowchart of an exemplary load operation in the read primitive of FIG. 8 in accordance with one embodiment.

With reference now to FIG. 7, there is illustrated an exemplary write primitive 700 by which one of host data processing systems 100*a*, 100*b* can write data into a system memory 108 of the other host 100*a* or 100*b* over a non-coherent communication link 302 in accordance with one embodiment. Write primitive 700 can form part of an instruction sequence of a hypervisor 402, OS 410, or application 412.

As shown, write primitive 700 includes a first store operation 702 that stores a data granule to memory. FIG. 9 provides a high-level logical flowchart of an exemplary embodiment of this store operation. In this illustrated embodiment, the store operation illustrated in FIG. 9 begins at block 900 and then proceeds to block 902, which illustrates a core 200 of a host 100 (hereafter, assumed to be host 100*a*) executing a store instruction that specifies the storage of a granule of data to memory. After any applicable effective-to-real address translation, core 200 stores the granule of data into its cache hierarchy (e.g., in its L2 cache 230) in association with the target real address, which is assigned to a system memory 108 in the other host 100 (i.e., host 100*b*). Because hosts 100*a*, 100*b* are non-coherent and NC communication link 302 does not transmit coherence messaging between hosts 100*a*, 100*b*, mere storage of the data granule into a cache memory of host 100*a* is insufficient to provide visibility to the hardware threads of host 100*b* of the association between the data granule and the target real address. Accordingly, the store operation further includes core 200 executing a cache clean instruction to force the data granule to be copied from the cache hierarchy of core 200 to the relevant system memory 108 of host 100*b* (block 904). Thereafter, the process of FIG. 9 ends at block 906.

Returning to FIG. 7, following store operation 702 in program order, write primitive 700 includes a barrier operation 704 that orders execution of all operations preceding barrier operation 704 in program order prior to execution of all operations following barrier operation 704 in program order. Following barrier operation 704 in program order write primitive 700 includes is a second store operation 706. Store operation 706 updates (e.g., to a value of 1) a flag variable residing in a system memory 108 of host 100*b* (which may be polled by a process executing on host 100*b*) to indicate that a new data granule has been written to a system memory 108 of host 100*b*. Store operation 706 can also be performed as described above with reference to FIG. 9.

Referring now to FIG. 8, there is depicted an exemplary read primitive 800 by which one of host data processing systems 100*a*, 100*b* can read data from a system memory 108 of the other host 100*a*, 100*b* over a non-coherent communication link 302 in accordance with one embodiment. Read primitive 800 can form part of an instruction sequence of a hypervisor 402, OS 410, or application 412.

As shown, read primitive 800 includes a first load operation 802 that loads a flag from memory. FIG. 10 provides a high-level logical flowchart of an exemplary embodiment of this load operation. In this embodiment, the load operation begins at block 1000 and then proceeds to block 1002, which illustrates a core 200 of a host 100 (hereafter, assumed to be host 100*b*) executing a flush instruction that specifies that any cached data within host 100*a* that is associated with the real address of the data granule to be loaded (e.g., the flag) be removed from the cache(s) of host 100*a* and, if necessary (which is usually not the case since 100*b* is not writing to the location), written back to the relevant memory controller 106 of host 100*b*. The load operation further includes core 200 thereafter executing a load instruction to load a data granule from the relevant system memory 108 of host 100*b* (block 1004). Thereafter, the process of FIG. 10 ends at block 1006.

Returning to FIG. 8, following load operation 802, load primitive 800 includes a compare operation 804 that compares the value of the flag loaded from host 100*b* to a predetermined value (e.g., 1) to determine if the granule of load data is ready to be read. If compare operation 804 determines the value of the flag indicates the granule of load data is ready to be read, conditional branch operation 806 causes execution of load primitive 800 to continue with load operation 810. Load operation 810, which loads a data granule from a system memory 108 of host 100*b*, can be performed as described above with reference to FIG. 10. If compare operation 804 determines the value of the flag indicate the granule of load data is not ready to be read, branch operation 808 causes execution of load primitive 800 to branch back to load operation 802, which has been described.

It should be appreciated by those skilled in the art that the semaphore communication described above with reference to FIGS. 7-10 is only one of multiple alternative techniques for supporting read and write communication between host data processing systems that are mutually non-coherent.

With reference now to FIG. 11, there is illustrated a high-level logical flowchart of an exemplary method by which a source host 100 migrates the state and page table entries 212 of an LPAR 404 from source host 100 to a destination host 100 in accordance with one embodiment. The process begins at block 1100 and the proceeds to block 1102, which illustrates the hypervisors 402 of source and destination hosts 100 (hereafter, assumed to be hosts 100*a* and 100*b*, respectively) communicating with each other to negotiate the allocation of the resources (e.g., hardware threads 406, real memory addresses, memory pages 209, etc.) of hosts 100*a*, 100*b* to LPARs 404 and to establish certain memory pages 209 for use in communication between hosts 100*a*, 100*b*. In at least some embodiments, the hypervisors 402 of the source host 100a and destination host 100b communicate at block 1102 via VIOS 420.

At blocks 1104-1106, the hypervisor 402 of source host 110a copies the state of the migrating LPAR 404 from source host 100a to destination host 100b. Referring specifically to block 1104, the hypervisor 402 of source host 100a brings the hardware threads 406 of the migrating LPAR 404 under its control. In addition, hypervisor 402 saves the state of each hardware thread 406 of the migrating LPAR 404 (e.g., contents of data and control registers related to the hardware thread(s) 406 in the executing core 200) and writes each such hardware thread state of the migrating LPAR 404 to a system memory 108 in destination host 100b (block 1106). The copying of the state(s) of the hardware thread(s) of the migrating LPAR 404 illustrated at block 1106 can be performed via NC communication link 302 utilizing write primitive 700 as described above with reference to FIGS. 7 and 9. At block 1108, hypervisor 402 of source host 110a also updates each valid (i.e., V=1) PTE 212 associated with each memory page 408 in the dataset of the migrating LPAR 404 by invalidating the PTE 212 (e.g., resetting valid field 502 to 0) of source host 100a and setting migration (MI) field 516 (e.g., to 1). Block 1108 further illustrates hypervisor 402 invalidating any entries corresponding to the invalidated PTEs 212 in address translation structures 206 of source host 100a and waiting for any and all in-flight operations in source host 100a that reference real addresses translated by the invalidated PTEs to drain from cores 200 of source host 100a.

At block 1110, the hypervisor 402 of source host 100a copies, from source host 100a to destination host 100b, those PTEs 212 in page frame table 210 of source host 100a that have migration field 516 set (e.g., MI=1) and that translate addresses in the memory pages 408 of the dataset of the migrating LPAR 404. Hypervisor 402 of source host 100a then monitors at block 1128 for receipt of a Done indication from hypervisor 402 of destination host 100b, as described further below with reference to block 1303 of FIG. 13. In response to receipt of the Done indication, hypervisor 402 of source host 100a releases all resources (e.g., real memory addresses, memory pages 408, hardware threads 406, etc.) allocated to the migrating LPAR 404 on source host 100a, thus permitting reallocation of those resources to one or more other LPARs (block 1130). Thereafter, the process of FIG. 11 ends at block 1134.

At the conclusion of FIG. 11, the state and PTEs 212 (though not yet validated) of the migrating LPAR 404 have been transferred from the source host 100a to the destination host 100b. However, the memory pages 408 containing the data set of the migrating LPAR 404 still reside in the memory system of the source host 100a.

Figure 12:
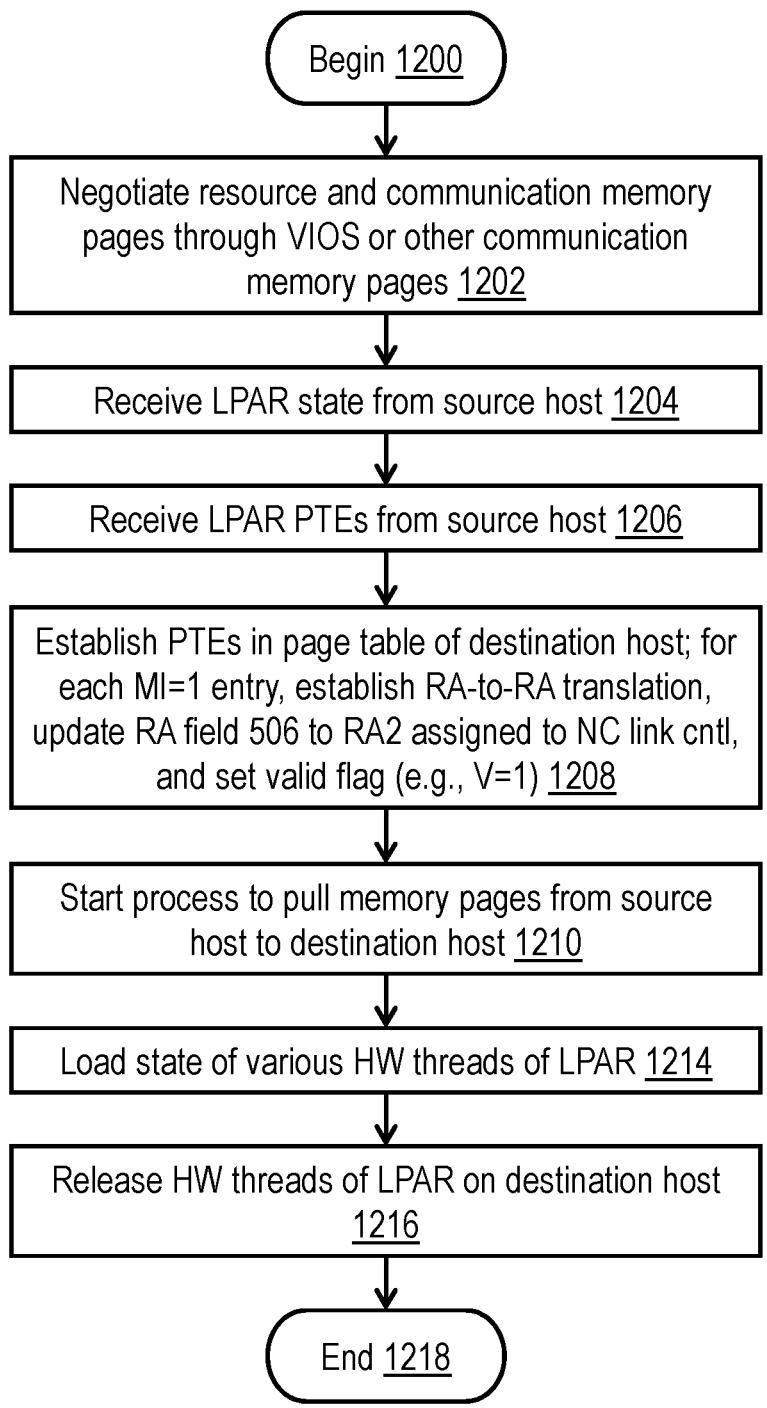
FIG. 12 is a high-level logical flowchart of an exemplary method by which a destination host receives and activates a migrating logical partition in accordance with one embodiment.

Referring now to FIG. 12, there is depicted a high-level logical flowchart of an exemplary method by which a destination host 100b receives and activates a migrating LPAR 404 in accordance with one embodiment. The process of FIG. 12 cooperates with the previously described process of FIG. 11 performed on source host 100a.

The process of FIG. 12 begins at block 1200 and then proceeds to block 1202, which illustrates the hypervisor 402 of destination hosts 100b communicating with the hypervisor 402 executing on source host 100a to negotiate the allocation of the resources (e.g., hardware threads 406, real memory addresses, memory pages 209, etc.) of hosts 100a, 100b to LPARs 404 and to establish certain memory pages 209 for use in communication between hosts 100a, 110b. In at least some embodiments, the hypervisors 402 of the source host 100a and destination host 100b communicate at block 1402 via VIOS 420.

The process proceeds from block 1202 to block 1204, which illustrates hypervisor 402 of destination host 100b receiving the state of the migrating LPAR 404 from source host 100a via NC communication link 302 and buffering the LPAR state. The LPAR state is transmitted by the source host 100a at block 1106 of FIG. 11. In addition, at block 1206, hypervisor 402 of destination host 100b buffers the PTEs 212 for the memory pages 408 of the migrating LPAR 404 received from source host 100a via NC communication link 302. These PTEs 212 are transmitted by the source host 100a at block 1110 of FIG. 11.

Block 1208 illustrates the hypervisor 402 of destination host 100b establishing the PTEs 212 associated with the memory pages 408 of the migrating LPAR 404 in the page frame table 210b in system memory 108b of destination server 100b. For each PTE 212 having migration field 516 set (e.g., MI=1), hypervisor 402 of destination host 100b establishes an RA-to-RA translation to translate destination host RAs translated by the PTE 212 (e.g., RA2) into source host RAs (e.g., RA1). As noted above with reference to FIG. 6B, the RA-to-RA translation can be established, for example, in a translation circuit 221b of NC link controller 220b in destination host 100b or in a translation circuit 221a of NC link controller 220a in source host 100a. In addition, hypervisor 402 of destination host 100b updates real address field 506 of each such PTE 212 to replace a first real address in the real address space 608a in source host 100a with a second real address in the real address space 608b of destination host 100b that is assigned to NC link controller 220b of destination host 100b. Hypervisor 402 then marks these MI=1 PTEs 212 as valid by setting valid field 502 (e.g. V=1), thereby making these PTEs 212 available for effective-to-real address translation on destination host 100b.

At block 1210, hypervisor 402 of destination host 100b initiates a process by which hypervisor 402 of destination server 100b "pulls" the memory pages 408 forming the dataset of the migrating LPAR 404 from source host 100a to system memory 108a in destination host 100b via NC communication link 302. An exemplary process by which destination host 100b pulls such memory pages 408 from source host 100a is described below with reference to FIG. 13. Hypervisor 402 of destination host 100b initiates execution of the migrating LPAR 404 on destination host 100b by loading the state of the various hardware threads 406 of the migrating LPAR 404 to one or more cores 200b of destination host 100b (block 1214) and releasing the hardware threads 406 of the migrating LPAR 404 to begin execution (block 1216). The process of FIG. 12 thereafter ends at block 1218.

Figure 13:
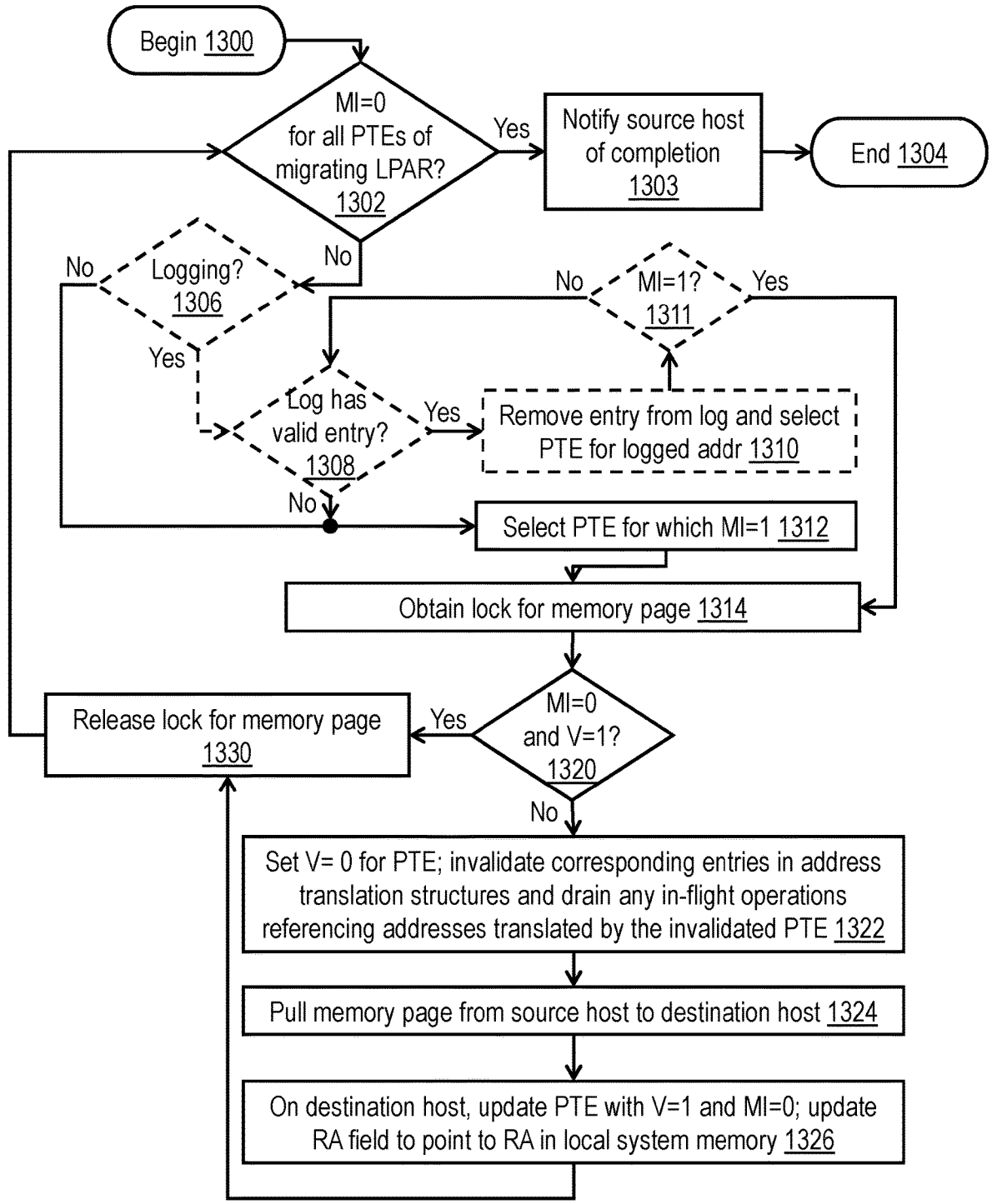
FIG. 13 is a high-level logical flowchart of an exemplary method by which a destination host "pulls" memory pages of a migrating logical partition from a source host in accordance with one embodiment.

Referring now to FIG. 13, there is illustrated a high-level logical flowchart of an exemplary method by which a destination host 100b "pulls" the memory pages 408 comprising the dataset of a migrating LPAR 404 from a source host 100a in accordance with one embodiment. This process can be initiated, for example, at block 1210 of FIG. 12.

The process of FIG. 13 begins at block 1300 and thereafter proceeds to block 1302, which illustrates hypervisor 402 of destination host 100b determining whether or not migration field 516 is reset (e.g., MI=0) in the PTEs 212 of all memory pages 408 in the dataset of the migrating LPAR 404. If so, the migration of the dataset of the migrating LPAR 404 from the source host 100a to destination host 100b is complete. Accordingly, hypervisor 402 of destination host 100b notifies the hypervisor 402 of source host

100a by issuing a Done indication via NC communication link 302, as discussed above with reference to block 1128 of FIG. 11 (block 1303). This Done indication signifies the completion of the migration of the LPAR 404. The process of FIG. 13 thereafter ends at block 1304.

If, however, hypervisor 402 of destination host 100b determines at block 1302 that at least one memory page 408 remains to be migrated to destination host 100b as indicated by the associated PTE 212 in page frame table 210b having MI=1, hypervisor 402 of destination host 100b selects one of un-migrated memory pages 408 in the dataset of the migrating LPAR 404 to migrate from source host 100a to destination host 100b. In some embodiments, hypervisor 402 of destination host 100b simply makes a sequential or random selection of a memory page 408 in the dataset to be migrated. In these embodiments, the process passes directly from block 1302 to block 1312, which illustrates hypervisor 402 of destination host 100b making a sequential or random selection from among the PTEs 212 for which migration field 512 is set (e.g., MI=1). The process passes from block 1312 to block 1314, which is described below.

In other embodiments, hypervisor 402 of destination host 100b prioritizes selection of frequently and/or recently accessed memory pages 408 for migration in order to improve the access latency of these "hot" memory pages. In these embodiments, which include optional blocks 1306, 1308, and 1310, cores 200 preferably selectively implement logging to track the frequently and/or recently accessed memory pages of migrating LPARs 404. For example, core(s) 200 of destination host 100b may log real addresses of the memory pages 408 that are accessed in the dataset of the migrating LPAR 404 within registers of one or more cores 200 and/or in a circular buffer or other data structure in a system memory 108. Thus, in such embodiments, in response to a negative determination at block 1302, hypervisor 402 of destination host 100b determines, at block 1306, if access logging has been employed for the migrating LPAR 404. If not, the process passes to block 1312, which has been described. If, however, hypervisor 402 of destination host 100b determines at block 1306 that access logging has been employed for the migrating LPAR 404, hypervisor 402 determines at block 1308 whether the access log contains a valid entry. If not, the process passes to block 1312, which has been described; in response, however, to an affirmative determination at block 1308 that the access log contains at least one valid entry, hypervisor 402 removes an entry from the access log and selects the PTE 212 for the accessed memory page to be migrated (block 1310). In some cases, the selection from the access log can be sequential or random. At block 1311, hypervisor 402 determines whether or not migration field 516 of the selected PTE 212 is set (e.g., MI=1), indicating that the PTE 212 has not yet been migrated. If not, the entry is in the log was a duplicate, and the process returns to block 1308, which has been described. If, however, hypervisor 402 determines at block 1311 that the migration field 516 of the PTE 212 selected at block 1310 is set, the process passes from block 1311 to block 1314.

At block 1314, hypervisor 402 obtains a lock for the memory page 408 associated with the selected PTE 212. Hypervisor 402 obtains the lock for the memory page 408 at block 1314 to prevent an OS 410 running in the migrating LPAR 404 from moving the memory page 408 while the hypervisor 402 is migrating the memory page 408. (If, at a different time, the OS 410 migrates a memory page 408 translated by a PTE 212 marked for migration, the OS 410 simply resets migration field 516 (i.e., MI=0) to signify no migration is necessary.) Hypervisor 402 of destination host 100b thereafter determines at block 1320 whether or not valid field 502 of the selected PTE 212 is set (e.g., V=1) and migration field 516 of the selected PTE 212 was reset (e.g., MI=0) during the process of obtaining the lock. If so, the process passes to block 1330, which is described below. If, however, hypervisor 402 of destination host 100b determines at block 1320 that valid field 502 is set (e.g., V=1) and migration field 516 has not been reset (e.g., MI=1), the process proceeds to block 1322.

Block 1322 illustrates hypervisor 402 of destination host 100b invalidating the selected PTE 212 by resetting valid field 502 of the selected PTE 212 (e.g., V=0). Block 1322 further illustrates hypervisor 402 of destination host 100b invalidating any entries corresponding to the invalidated PTE 212 in address translation structures 206 of destination host 100b and waiting for any and all in-flight operations in destination host 100b that reference real addresses translated by the invalidated PTE 212 to drain from cores 200 of destination host 100b. Hypervisor 402 then issues one or more memory access requests to source host 100a via NC communication link 302 in order to pull the memory page 408 associated with the selected PTE 212 from the memory system of source host 100a to the system memory 108 of destination host 100b (block 1324). Once the memory page 408 is pulled to system memory 108 of destination host 100b, hypervisor 402 of destination host 100b updates the selected PTE 212 on destination host 100b by setting valid field 502 (e.g., V=1), resetting migration field 516 (e.g., MI=0) and updating real address field 506 with the new real address of the memory page 408 in the system memory 108 of destination host 100b (e.g., RA3 of FIG. 6B) (block 1326). Following block 1326, hypervisor 402 of destination host 100b releases the lock for the memory page 408 (block 1330). Thereafter, the process of FIG. 13 returns to block 1302, which has been described.

Figure 14:
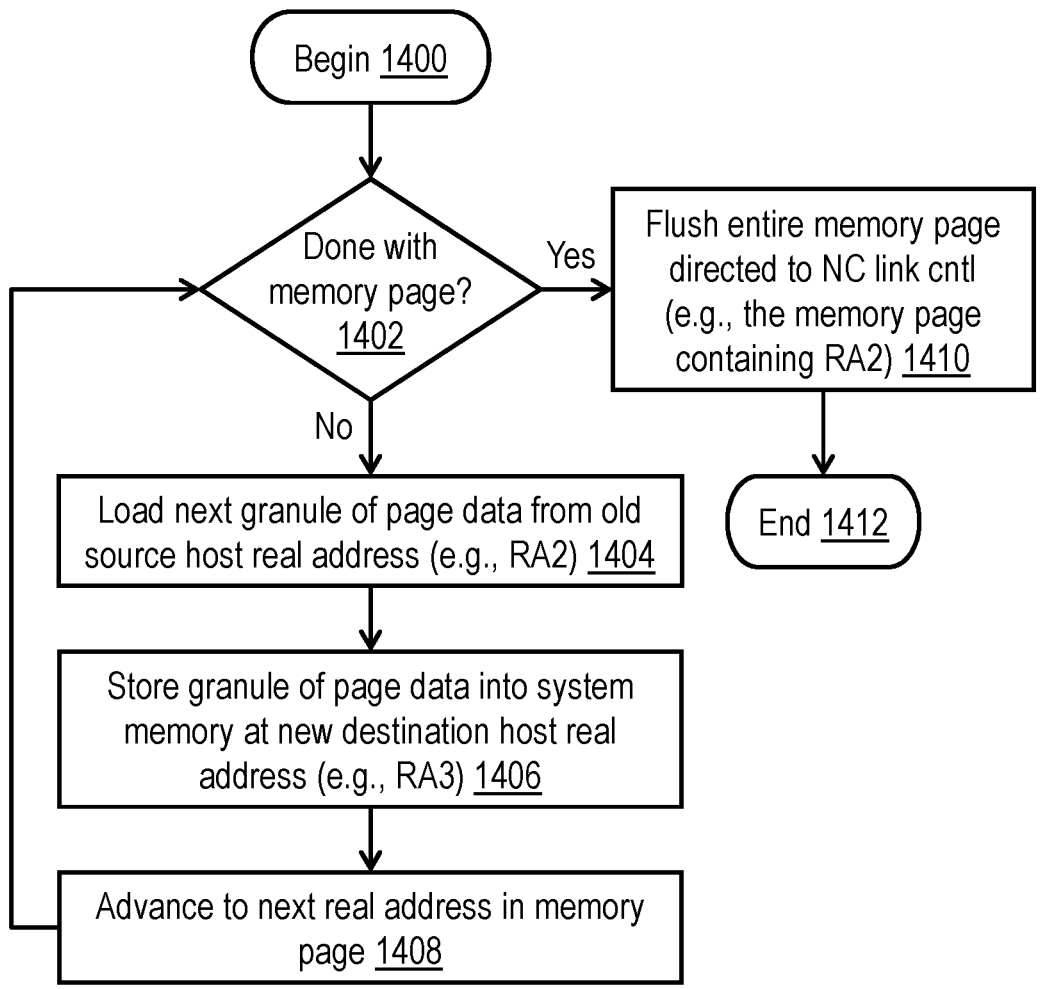
FIG. 14 is a high-level logical flowchart of an exemplary method by which a destination host retrieves the individual data granules of a memory page of a migrating logical partition from the memory system of a source host in accordance with one embodiment.

With reference now to FIG. 14, there is illustrated a more detailed flowchart of an exemplary method by which a destination host 100b pulls a memory page 408 of a migrating LPAR 408 from the memory system of source host 100a in accordance with one embodiment. The illustrated process can be performed by destination host 100b, for example, at block 1324 of FIG. 13.

The process of FIG. 14 begins at block 1400 and thereafter proceeds to block 1402, which illustrates hypervisor 402 of destination host 100b determining whether or not all data granules of a given memory page 408 in the dataset of the migrating LPAR 404 are installed in the local system memory 108 of destination host 100b. If so, the process proceeds to block 1410, which is described below. If, however, hypervisor 402 of destination host 100b determines at block 1402 that at least one data granule of the given memory page 408 remains to be migrated from source host 100a to destination host 100b, hypervisor 402 of destination host 100b loads a next data granule of page data from source host 100a by issuing a load operation to source host 100a via its NC link controller 220b and NC communication link 302. Additional details regarding this load operation and its processing by source host 100a are provided below with reference to FIG. 15.

At block 1406, hypervisor 402 of destination host 100b receives the requested data granule from source host 100a and stores the data granule into system memory 108 at a location corresponding to a new destination host real address (e.g., RA3 of FIG. 6B). Hypervisor 402 of destination host 100b then advances to the next real address of the given memory page 408 (block 1408) and returns to block 1402 and following blocks. This process continues iteratively until hypervisor 402 of destination host 100b determines at block 1402 that all data granules of the given memory page 408 have been migrated from the memory system of source host 100a to the system memory 108 of destination host 100b. In response to an affirmative determination at block 1402 that the complete memory page 408 has been migrated, hypervisor 402 of destination host 100b flushes from the memory system of destination host 100b the entire old memory page 408 containing real addresses assigned to NC link controller 220b (e.g., RA2 of FIG. 6B). The process of FIG. 14 thereafter ends at block 1412.

Figure 15:
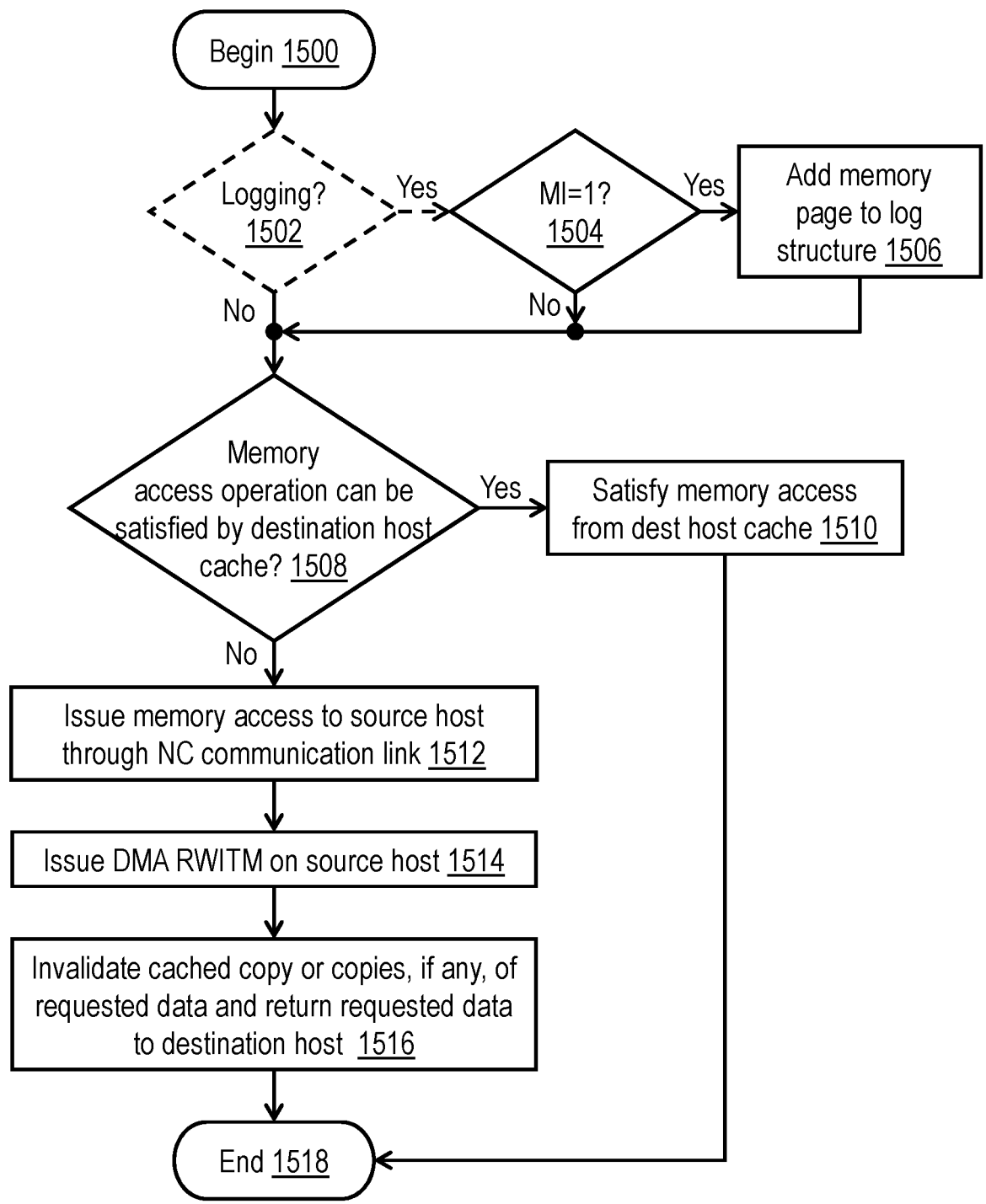
FIG. 15 is a high-level logical flowchart of an exemplary method by which source and destination hosts process a memory access request of the destination host for a data granule of a migrating logical partition in accordance with one embodiment.

With reference now to FIG. 15, there is illustrated a high-level logical flowchart of an exemplary method by which source and destination hosts 100 process a memory access request of the destination host 100b for a data granule in the dataset of a migrating LPAR 404 in accordance with one embodiment. The process of FIG. 15 begins at block 1500, for example, in response to execution by a core 200 in destination host 100b of a memory access instruction, such as load instruction or store instruction, directed to the dataset of an LPAR 404 being migrated from source host 100a to destination host 100b. The memory access instruction may be, for example, a user-level instruction, operating system instruction, or hypervisor instruction. In general, the memory access instruction will include an indication of the instruction type, one or more operands for calculating an target effective address, and if a store instruction, an indication of a location of a granule of store data.

The process then proceeds from block 1500 to optional block 1502, which illustrates the process diverging, depending upon whether or not core 200 of destination host 100b implements access logging. If not, the process passes to block 1508, which is described below. If, however, core 200 of destination host 100b implements access logging, core 200 of destination host 100b determines at block 1504 whether the migration field 516 of the relevant PTE 212 (on destination host 100b) for the target real address of the memory access operation is set (e.g., MI=1) to indicate that the memory page 408 has yet to be migrated to destination host 100b. If not, the process passes to block 1508. If, however, a determination is made at block 1504 that the migration field 516 of the relevant PTE 212 is set, core 200 of destination host 100b adds the real address of the memory page to which the target real address of the memory access operation belongs to the access log (block 1506). The process then passes to block 1508.

Block 1508 depicts a determination by the cache hierarchy of destination host 100b regarding whether or not the memory access operation can be satisfied by reference to data in the cache hierarchy of destination host 100b. The determination shown at block 1508 can include a determination of whether the target real address hit in the cache hierarchy of destination host 100b, and if so, the coherence state associated with the target real address in the cache hierarchy of destination host 100b. In response to an affirmative determination at block 1508, the memory access operation of the migrating LPAR 404 is satisfied by the cache hierarchy of destination host 100b (block 1510). Thereafter, the process of FIG. 15 ends at block 1518.

In response to a negative determination at block 1508, NC link controller 220b of destination host 100b issues the memory access operation to NC link controller 220a of source host 100a via NC communication link 302. As noted above, in this case, the target real address specified in the memory access operation when originally issued is within real address space 608b of destination host 100b and is assigned to NC link controller 220b of destination host 100b. This target real address is translated by either translation circuit 221b of NC link controller 220b or translation circuit 221a of NC link controller 220a into a real address (e.g., RA1) in real address space 608a of source host 100a.

Regardless of the operation type of the memory access operation received from destination host 100b, NC link controller 220a of source host 100a preferably issues the memory access operation on the system fabric of source host 100a as a direct memory access (DMA) read-with-intent-to-modify (RWITM) operation (block 1514). As indicated at block 1516, the DMA RWITM operation causes source host 100a to invalidate any copy or copies of the target memory granule cached in source host 100a and return the requested memory granule (before invalidation) to destination host 100b. The invalidation of any cached copy of the requested data granule on source host 100a ensures that data previously accessed by (and possibly modified by) destination host 100b is not subsequently modified by a stale cached copy of a target data granule castout from the cache hierarchy of source host 100a. Following block 1516, the process of FIG. 15 ends at block 1518.

Upon review of FIG. 15, it should be appreciated that one benefit of the described technique of LPAR migration is that the migrating LPAR 404 does not suffer any page faults due to the migration state of memory pages 408 in its dataset. That is, regardless of whether or not the memory page 408 containing the target address of a memory access operation resides on source host 100a or destination host 100b, the memory access request can be serviced without a page fault. Of course, memory access operations targeting memory pages 408 that have not yet been migrated to destination host 100b will incur a relatively higher access latency than those directed to already migrated memory pages 408; however, the mechanics of access to the not-yet-migrated memory pages 408, which are handled in hardware, are transparent to the hardware thread(s) issuing the memory access operations.

Figure 16:
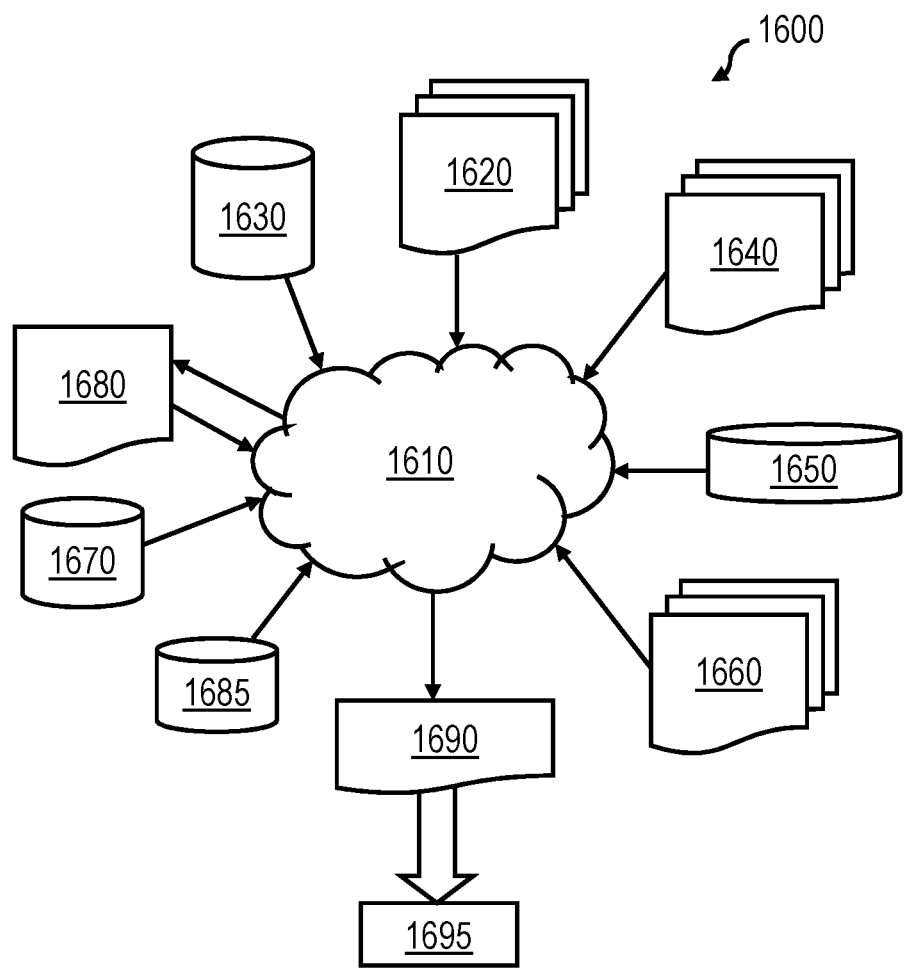
FIG. 16 is a data flow diagram illustrating a design process in accordance with one embodiment.

Referring now to FIG. 16, there is depicted a block diagram of an exemplary design flow 1600 used for example, in semiconductor IC logic design, simulation, test, layout, and manufacture. Design flow 1600 includes processes, machines and/or mechanisms for processing design structures or devices to generate logically or otherwise functionally equivalent representations of the design structures and/or devices described herein. The design structures processed and/or generated by design flow 1600 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1600 may vary depending on the type of representation being designed. For example, a design flow 1600 for building an application specific IC (ASIC) may differ from a design flow 1600 for designing a standard component or from a design flow 1600 for instantiating the design into a programmable array, for example a programmable gate array (PGA) or a field programmable gate array (FPGA) offered by Altera® Inc. or Xilinx® Inc.

FIG. 16 illustrates multiple such design structures including an input design structure 1620 that is preferably processed by a design process 1600. Design structure 1620 may be a logical simulation design structure generated and processed by design process 1600 to produce a logically equivalent functional representation of a hardware device. Design structure 1620 may also or alternatively comprise data and/or program instructions that when processed by design process 1600, generate a functional representation of the physical structure of a hardware device. Whether representing functional and/or structural design features, design structure 1620 may be generated using electronic computer-aided design (ECAD) such as implemented by a core developer/designer. When encoded on a machine-readable data transmission, gate array, or storage medium, design structure 1620 may be accessed and processed by one or more hardware and/or software modules within design process 1600 to simulate or otherwise functionally represent an electronic component, circuit, electronic or logic module, apparatus, device, or system such as those shown herein. As such, design structure 1620 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1600 preferably employs and incorporates hardware and/or software modules for synthesizing, translating, or otherwise processing a design/simulation functional equivalent of the components, circuits, devices, or logic structures shown herein to generate a netlist 1680 which may contain design structures such as design structure 1620. Netlist 1680 may comprise, for example, compiled or otherwise processed data structures representing a list of wires, discrete components, logic gates, control circuits, I/O devices, models, etc. that describes the connections to other elements and circuits in an integrated circuit design. Netlist 1680 may be synthesized using an iterative process in which netlist 1680 is resynthesized one or more times depending on design specifications and parameters for the device. As with other design structure types described herein, netlist 1680 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1600 may include hardware and software modules for processing a variety of input data structure types including netlist 1680. Such data structure types may reside, for example, within library elements 1630 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1640, characterization data 1650, verification data 1660, design rules 1670, and test data files 1685 which may include input test patterns, output test results, and other testing information. Design process 1600 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1600 without deviating from the scope and spirit of the invention. Design process 1600 may also include modules for performing standard circuit design processes such as timing analysis, verification, design rule checking, place and route operations, etc.

Design process 1600 employs and incorporates logic and physical design tools such as HDL compilers and simulation model build tools to process design structure 1620 together with some or all of the depicted supporting data structures along with any additional mechanical design or data (if applicable), to generate a second design structure 1690. Design structure 1690 resides on a storage medium or programmable gate array in a data format used for the exchange of data of mechanical devices and structures (e.g., information stored in an IGES, DXF, Parasolid XT, JT, DRG, or any other suitable format for storing or rendering such mechanical design structures). Similar to design structure 1620, design structure 1690 preferably comprises one or more files, data structures, or other computer-encoded data or instructions that reside on transmission or data storage media and that when processed by an ECAD system generate a logically or otherwise functionally equivalent form of one or more of the embodiments of the invention. In one embodiment, design structure 1690 may comprise a compiled, executable HDL simulation model that functionally simulates the devices shown herein.

Design structure 1690 may also employ a data format used for the exchange of layout data of integrated circuits and/or symbolic data format (e.g., information stored in a GDSII (GDS2), GL1, OASIS, map files, or any other suitable format for storing such design data structures). Design structure 1690 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1690 may then proceed to a stage 1695 where, for example, design structure 1690: proceeds to tape-out, is released to manufacturing, is released to a mask house, is sent to another design house, is sent back to the customer, etc.

As has been described, in at least one embodiment, a destination host includes a processor core, a system fabric, a memory system, and a link controller communicatively coupled to the system fabric and configured to be communicatively coupled, via a communication link, to a source host with which the destination host is non-coherent. The destination host migrates, via the communication link, a state of a logical partition from the source host to the destination host and page table entries for translating addresses of a dataset of the logical partition from the source host to the destination host. After migrating the state and page table entries, the destination host initiates execution of the logical partition on the processor core while at least a portion of the dataset of the logical partition resides in the memory system of the source host and migrates, via the communication link, the dataset of the logical partition to the memory system of the destination host.

In some examples or operating scenarios, while migrating the dataset of the logical partition, the logical partition executing on the destination host may access any data within the dataset of the logical partition without page fault, regardless of a migration status of memory pages containing said any data.

In some examples or operating scenarios, migrating the dataset includes migrating at least some of the dataset of the logical partition from the source host to the destination host after the logical partition has begun execution on the destination host.

In some examples or operating scenarios, the destination host tracks in the page table entries which of a plurality of corresponding memory pages in the dataset have been migrated to the destination host.

In some examples or operating scenarios, the destination host coordinates migration of the logical partition from the source host to the destination host utilizing communication via a network connection, but refrains from migrating the dataset, the page table entries, and the state of the logical partition via the network connection.

In some examples or operating scenarios, the destination host includes a page frame table and a link controller coupled to the communication link, where the link controller has an associated real address range within a real address space of the destination host. Migrating page table entries includes the destination host receiving a page table entry for a memory page in the dataset of the migrating logical partition from the source host, where the page table entry specifies a first real address in a real address space of the source host. The destination host installs the page table entry in the page frame table and updates the first real address in the page table entry to a second real address within the real address range associated with the link controller. The destination host also establishes in a translation circuit a real address-to-real address translation between the second real address and the first real address.

In some examples or operating scenarios, based on a first memory access operation of logical partition on the destination host prior to migration of the memory page from the source host to the destination host, a target real address of the memory access operation is translated by reference to the real address-to-real address translation in the translation circuit to obtain a resulting real address, and a corresponding second memory access operation that specifies the resulting real address is issued in the source host.

In some examples or operating scenarios, the second memory access operation is a direct memory access (DMA) read-with-intent-to-modify operation that forces invalidation in the source host of any cached copy of data associated with the resulting real address.

While various embodiments have been particularly shown and described, it will be understood by those skilled in the art that various changes in form and detail may be made therein without departing from the scope of the appended claims and these alternate implementations all fall within the scope of the appended claims.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although aspects have been described with respect to a computer system executing program code that directs the functions of the present invention, it should be understood that present invention may alternatively be implemented as a program product including a computer-readable storage device storing program code that can be processed by a processor of a data processing system to cause the data processing system to perform the described functions. The computer-readable storage device can include volatile or non-volatile memory, an optical or magnetic disk, or the like, but excludes non-statutory subject matter, such as propagating signals per se, transmission media per se, and forms of energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a data processing environment, the method comprising:
   migrating, via a communication link, a state of a logical partition from a source host to a destination host, wherein each of the source host and the destination host has a respective memory system and the memory system of the destination host is non-coherent with the memory system of the source host;
   migrating, via the communication link, page table entries for translating addresses of a dataset of the logical partition from the source host to the destination host;
   after migrating the state and the page table entries, initiating execution of the logical partition on the destination host while at least a portion of the dataset of the logical partition resides in the memory system of the source host; and
   after beginning execution of the logical partition on the destination host, migrating, via the communication link, the portion of the dataset of the logical partition from the memory system of the source host to the memory system of the destination host.

2. The method of claim 1, and further comprising:
   while migrating the dataset of the logical partition, the logical partition executing on the destination host accessing any data within the dataset of the logical partition without page fault, regardless of a migration status of memory pages containing said any data, wherein said any data includes data residing on the source host.

3. The method of claim 1, further comprising the destination host tracking in the page table entries which of a plurality of corresponding memory pages in the dataset have been migrated to the destination host.

4. The method of claim 1, and further comprising:
the destination host coordinating migration of the logical partition from the source host to the destination host utilizing communication via a network connection; and
the destination host refraining from migrating the dataset, the page table entries, and the state of the logical partition via the network connection, but instead migrating the dataset via the communication link.

5. The method of claim 1, wherein:
the destination host includes a link controller coupled to the communication link, wherein said link controller has an associated real address range within a real address space of the destination host;
the destination host includes a page frame table;
migrating page table entries includes:
  the destination host receiving a page table entry for a memory page in the dataset of the migrating logical partition from the source host, said page table entry specifying a first real address in a real address space of the source host;
  the destination host installing the page table entry in the page frame table and updating the first real address in the page table entry to a second real address within the real address range associated with the link controller;
  the destination host establishing in a translation circuit a real address-to-real address translation between the second real address and the first real address.

6. The method of claim 5, further comprising:
based on a first memory access operation of logical partition on the destination host prior to migration of the memory page from the source host to the destination host, translating a target real address of the memory access operation by reference to the real address-to-real address translation in the translation circuit to obtain a resulting real address and issuing a corresponding second memory access operation that specifies the resulting real address in the source host.

7. The method of claim 6, wherein the second memory access operation is a direct memory access (DMA) read-with-intent-to-modify operation that forces invalidation in the source host of any cached copy of data associated with the resulting real address.

8. The method of claim 1, wherein:
communication between the source host and destination host via the communication link is non-coherent;
the destination host includes:
  a system fabric that conveys memory access requests specifying real addresses within the real address space of the destination host;
  a link controller communicatively coupled between the communication link and the system fabric, wherein the link controller is assigned a real address in the real address space of the source host; and
migrating the portion of the dataset includes issuing, on the system fabric, a memory access request specifying the real address.

9. A data processing system that is a destination host, the data processing system comprising:

a processor core;
a memory system coupled to the processor core;
a link controller communicatively coupled to the processor core and configured to be communicatively coupled to a source host via a communication link, wherein the destination host is non-coherent with respect to the source host; and
wherein the processor core is configured to migrate a logical partition from the source host to the destination host via the communication link by:
  migrating a state of the logical partition from the source host to the destination host;
  migrating page table entries for translating addresses of a dataset of the logical partition from the source host to the destination host;
  after migrating the state and the page table entries, initiating execution of the logical partition on the destination host while at least a portion of the dataset of the logical partition resides in the memory system of the source host; and
  after beginning execution of the logical partition on the destination host, migrating, via the communication link, the portion of the dataset of the logical partition from the memory system of the source host to the memory system of the destination host.

10. The data processing system of claim 9, wherein the processor core is further configured to perform:
while migrating the dataset of the logical partition, accessing any data within the dataset of the logical partition without page fault, regardless of a migration status of memory pages containing said any data, wherein said any data includes data residing on the source host.

11. The data processing system of claim 9, wherein the processor core is further configured to perform:
tracking in the page table entries which of a plurality of corresponding memory pages in the dataset have been migrated to the destination host.

12. The data processing system of claim 9, wherein the processor core is further configured to perform:
coordinating migration of the logical partition from the source host to the destination host utilizing communication via a network connection; and
refraining from migrating the dataset, the page table entries, and the state of the logical partition via the network connection, but instead migrating the dataset via the communication link.

13. The data processing system of claim 9, wherein:
the link controller has an associated real address range within a real address space of the destination host;
the destination host includes a page frame table;
migrating page table entries includes:
  the destination host receiving a page table entry for a memory page in the dataset of the migrating logical partition from the source host, said page table entry specifying a first real address in a real address space of the source host;
  the destination host installing the page table entry in the page frame table and updating the first real address in the page table entry to a second real address within the real address range associated with the link controller;
  the destination host establishing in a translation circuit a real address-to-real address translation between the second real address and the first real address.

14. The data processing system of claim 13, wherein the processor core is further configured to perform:

based on a first memory access operation of logical partition on the destination host prior to migration of the memory page from the source host to the destination host, causing a target real address of the memory access operation to be translated by reference to the real address-to-real address translation in the translation circuit to obtain a resulting real address and causing a corresponding second memory access operation that specifies the resulting real address to be issued in the source host.

15. The data processing system of claim 14, wherein the second memory access operation is a direct memory access (DMA) read-with-intent-to-modify operation that forces invalidation in the source host of any cached copy of data associated with the resulting real address.

16. The data processing system of claim 9, wherein:
communication between the source host and destination host via the communication link is non-coherent;
the destination host includes:
  a system fabric that conveys memory access requests specifying real addresses within the real address space of the destination host;
  the link controller is communicatively coupled between the communication link and the system fabric, wherein the link controller is assigned a real address in the real address space of the source host; and
migrating the portion of the dataset includes issuing, on the system fabric, a memory access request specifying the real address.

17. A program product, comprising:
a computer-readable storage device; and
program code, stored within the computer-readable storage device, which when executed by a data processing system serving as a destination host causes the destination host to migrate a logical partition from the source host with which the destination host is non-coherent to the destination host via a communication link by:
  migrating a state of the logical partition from the source host to the destination host;
  migrating page table entries for translating addresses of a dataset of the logical partition from the source host to the destination host;
  after migrating the state and the page table entries, initiating execution of the logical partition on the destination host while at least a portion of the dataset of the logical partition resides in the memory system of the source host; and
  after beginning execution of the logical partition on the destination host, migrating, via the communication link, the portion of the dataset of the logical partition from the memory system of the source host to the memory system of the destination host.

18. The program product of claim 17, wherein the program code causes the destination host to perform:
while migrating the dataset of the logical partition, accessing any data within the dataset of the logical partition without page fault, regardless of a migration status of memory pages containing said any data, wherein said any data includes data residing on the source host.

19. The program product of claim 17, wherein the program code causes the destination host to perform:
tracking in the page table entries which of a plurality of corresponding memory pages in the dataset have been migrated to the destination host.

20. The program product of claim 17, wherein the program code causes the destination host to perform:
coordinating migration of the logical partition from the source host to the destination host utilizing communication via a network connection; and
refraining from migrating the dataset, the page table entries, and the state of the logical partition via the network connection, but instead migrating the dataset via the communication link.

21. The program product of claim 17, wherein:
the link controller has an associated real address range within a real address space of the destination host;
the destination host includes a page frame table;
migrating page table entries includes:
  the destination host receiving a page table entry for a memory page in the dataset of the migrating logical partition from the source host, said page table entry specifying a first real address in a real address space of the source host;
  the destination host installing the page table entry in the page frame table and updating the first real address in the page table entry to a second real address within the real address range associated with the link controller;
  the destination host establishing in a translation circuit a real address-to-real address translation between the second real address and the first real address.

22. The program product of claim 21, wherein the program code causes the destination host to perform:
based on a first memory access operation of logical partition on the destination host prior to migration of the memory page from the source host to the destination host, causing a target real address of the memory access operation to be translated by reference to the real address-to-real address translation in the translation circuit to obtain a resulting real address and causing a corresponding second memory access operation that specifies the resulting real address to be issued in the source host.

23. The program product of claim 22, wherein the second memory access operation is a direct memory access (DMA) read-with-intent-to-modify operation that forces invalidation in the source host of any cached copy of data associated with the resulting real address.

24. The program product of claim 17, wherein:
communication between the source host and destination host via the communication link is non-coherent;
the destination host includes:
  a system fabric that conveys memory access requests specifying real addresses within the real address space of the destination host;
  the link controller is communicatively coupled between the communication link and the system fabric, wherein the link controller is assigned a real address in the real address space of the source host; and
migrating the state includes issuing, on the system fabric, a memory access request specifying the real address.

* * * * *